(12) United States Patent
Johnson et al.

(10) Patent No.: US 7,916,026 B2
(45) Date of Patent: Mar. 29, 2011

(54) REAL-TIME LOCATION SYSTEM USING TAG INTERROGATOR AND EMBEDDED OR FIXED TAG TRANSMITTERS

(75) Inventors: Walter S. Johnson, San Jose, CA (US); Santiago Romero, Mount Airy, MD (US)

(73) Assignee: Zebra Enterprise Solutions Corp., Oakland, CA (US)

( * ) Notice: Subject to any disclaimer, the term of this patent is extended or adjusted under 35 U.S.C. 154(b) by 519 days.

(21) Appl. No.: 11/938,866

(22) Filed: Nov. 13, 2007

(65) Prior Publication Data

US 2008/0111693 A1    May 15, 2008

Related U.S. Application Data

(60) Provisional application No. 60/865,964, filed on Nov. 15, 2006.

(51) Int. Cl.
*G08B 13/14* (2006.01)

(52) U.S. Cl. ............... 340/572.1; 340/572.4; 340/572.7; 340/572.8; 340/5.61; 340/539.13; 340/539.26; 340/10.1; 342/463; 342/464

(58) Field of Classification Search ............... 340/572.1, 340/572.4, 572.7, 572.8, 5.61, 539.13, 539.26, 340/286.07, 10.1; 342/463, 464
See application file for complete search history.

(56) References Cited

U.S. PATENT DOCUMENTS

| | | | |
|---|---|---|---|
| 5,074,706 A | 12/1991 | Paulos | 404/12 |
| 5,604,715 A | 2/1997 | Aman et al. | 367/118 |
| 5,920,287 A | 7/1999 | Belcher et al. | 342/450 |
| 5,995,046 A * | 11/1999 | Belcher et al. | 342/450 |
| 6,026,378 A | 2/2000 | Onozaki | 705/28 |
| 6,121,926 A | 9/2000 | Belcher et al. | 342/450 |
| 6,127,976 A * | 10/2000 | Boyd et al. | 342/463 |
| 6,317,082 B1 | 11/2001 | Bacon et al. | 342/465 |
| 6,356,802 B1 | 3/2002 | Takehara et al. | 700/215 |
| 6,380,894 B1 | 4/2002 | Boyd et al. | 342/450 |
| 6,433,750 B1 | 8/2002 | Sugita | 343/713 |
| 6,434,194 B1 | 8/2002 | Eisenberg et al. | 375/238 |
| 6,502,005 B1 | 12/2002 | Wrubel et al. | 700/116 |
| 6,577,246 B1 | 6/2003 | Handa et al. | 340/901 |
| 6,577,921 B1 | 6/2003 | Carson | 700/214 |
| 6,593,885 B2 | 7/2003 | Wisherd et al. | 342/463 |
| 6,655,582 B2 | 12/2003 | Wohl et al. | 235/380 |

(Continued)

OTHER PUBLICATIONS

Search Report and Written Opinion for PCT/US2007/023895 dated Nov. 18, 2008.

(Continued)

*Primary Examiner* — Tai T Nguyen
(74) *Attorney, Agent, or Firm* — Alston & Bird LLP

(57) ABSTRACT

A system tracks vehicles within a terminal and includes at least one tag interrogator mounted on a vehicle to be identified and tracked within the terminal. The tag interrogator is operative for emitting a signal containing data identifying the vehicle to which the tag interrogator is mounted. At least one tag transmitter is fixed at a known location within the terminal where vehicles are to be identified and receptive to a tag interrogator on the vehicle when the vehicle passes within proximity to the fixed tag transmitter for transmitting a wireless RF signal having data identifying the tag transmitter and identifying the tag interrogator as an identifier for the vehicle to which the tag interrogator is mounted. At least one access point is positioned at the terminal for receiving the RF signal from the tag transmitter for subsequent processing to verify vehicle identity at the known location.

25 Claims, 22 Drawing Sheets

U.S. PATENT DOCUMENTS

| | | | |
|---|---|---|---|
| 6,657,586 B2 | 12/2003 | Turner | 342/357.07 |
| 6,665,585 B2 | 12/2003 | Kawase | 700/226 |
| 6,728,629 B2 | 4/2004 | Oka et al. | 701/200 |
| 6,774,817 B2 | 8/2004 | Tanji et al. | 340/933 |
| 6,812,839 B1 | 11/2004 | Belcher et al. | 340/572.1 |
| 6,822,551 B2 * | 11/2004 | Li et al. | 340/5.1 |
| 6,853,687 B2 | 2/2005 | Harrington et al. | 375/259 |
| 6,859,485 B2 | 2/2005 | Belcher | 375/130 |
| 6,892,054 B2 | 5/2005 | Belcher et al. | 455/63.1 |
| 7,525,431 B2 * | 4/2009 | Britton et al. | 340/572.1 |
| 2002/0070891 A1 | 6/2002 | Huston et al. | 342/357.09 |
| 2002/0181565 A1 | 12/2002 | Boyd et al. | 375/152 |
| 2003/0001775 A1 | 1/2003 | Turner | |
| 2003/0020634 A1 | 1/2003 | Banerjee et al. | |
| 2003/0137968 A1 | 7/2003 | Lareau et al. | 370/349 |
| 2003/0191555 A1 | 10/2003 | Takehara et al. | 700/215 |
| 2003/0201394 A1 * | 10/2003 | Peoples | 250/336.1 |
| 2004/0102870 A1 | 5/2004 | Andersen et al. | 700/215 |
| 2004/0233041 A1 * | 11/2004 | Bohman et al. | 340/10.1 |
| 2004/0249557 A1 | 12/2004 | Harrington et al. | 701/115 |
| 2006/0220851 A1 | 10/2006 | Wisherd | 340/568.1 |
| 2007/0223996 A1 | 9/2007 | Green et al. | 404/9 |

OTHER PUBLICATIONS

Molisch et al., "*MIMO Systems With Antenna Selection—An Overview*," Mar. 2004, pp. 1-18.

Jorichs, Von Hartmut, "*Neue Systeme zur Steuerung von Flurforderzeugen*," Technische Rundschau, Jan. 6, 1989, pp. 34-39.

"Wherenet Introduces Wireless Locations Solution for Marine Terminals," Online, Oct. 21, 2003, www.wherenet.com/pressreleases/pr_10212003.html, 2 pages.

"Dockside Cranes Get Brains," RFID Journal, Online, Oct. 29, 2003, www.rfidjournal.com/articie/articleview/630/1/17, 2 pages.

"WhereLan," Online, 2003, www.wherenet.com/pdfs/wherelan%204.9.04.pdf, 1 page.

"WhereTag III," Online, 2003, www.wherenet.com/pdfs/wheretag%20III.5.3.0.pdf, 1 page.

"WherePort III," Online, 2003, www.wherenet.com/pdfs/whereport.10.1.0.pdf, 2 pages.

*Position Tracking Interface Unit (PTIU) for RTG's*, Paceco Corp., (2002), pp. 1-6.

* cited by examiner

REAL-TIME LOCATION SYSTEM USING TAG INTERROGATOR AND EMBEDDED OR FIXED TAG TRANSMITTERS

RELATED APPLICATION

This application is based upon prior filed provisional application Ser. No. 60/865,964 filed Nov. 15, 2006.

FIELD OF THE INVENTION

This invention relates to real-time location systems (RTLS) using tag transmitters and tag interrogators.

BACKGROUND OF THE INVENTION

The modern marine terminal must efficiently process an increasing number of containers in an area of limited space with little, if any, land available for expansion. Capacity demands are increasing rapidly with higher volumes of container traffic worldwide and new, larger container ships coming on-line. Specific containers should be located on demand among the thousands of containers at any given time, but this can be difficult if there is a lack of an accurate and real-time container identification and tracking system of drayage tractors, switched tractors, wheeled container chassis, top and side pick loaders, and gantry and quay cranes. Locating a container can also be complicated by the number of ways in which containers can be processed through a terminal. For example, some containers arrive via a vessel or train and are driven through a check-in gate by an outside truck. Once a container enters the terminal, it can be parked on a chassis or bombcart in a terminal, or removed from the chassis and placed on top a stack of shipping containers. When a container is to be retrieved, it must be located among the thousands of containers in the terminal. These containers may be moved around the terminal by outside drivers, or moved by marine terminal drivers, using a client's tractor with terminal equipment.

Maintaining inventory and track of every container in the terminal is difficult and the large number of containers and the different ways in which the containers can be moved throughout the terminal makes it difficult to locate a specific container when it is needed. Also, the marine terminal often does not run smoothly and this complicates the location system.

Different systems are used for processing containers through a marine terminal, such as discharging a container from a vessel to chassis. For example, containers may arrive in a marine terminal via a vessel or rail. Other containers can be discharged from a vessel to ground. When containers arrive at a marine terminal via a vessel or train, they can be "discharged" or placed on a bombcart/port trailer to be stacked, instead of parked on a chassis. Other containers can be checked in at a gate. Instead of arriving via a vessel or train, a container may arrive via a central check-in gate. Drivers employed by customers of the marine terminal arrive at the gate for check-in, where they pass through a gate much like a highway toll plaza. At this gate, information is collected about the container, after which the driver is instructed either to park the chassis and container in a particular location or to discharge the container to ground.

These different systems for processing containers make it difficult to track the containers in a marine terminal. Tracking container movement throughout the marine terminal is important because searching for any misplaced containers requires time and labor costs and adds to the shipping time of goods.

One prior art system uses brightly colored, highly distinctive sticker magnets placed on each container. Terminal employees walk around the terminal looking for these magnets and noting their locations when they are found. This solution is accurate, but the containers could be moved within the terminal after the sticker magnets have been sighted, and the process of searching for sticker magnets on containers is labor-intensive. There is also a time-lag in obtaining data using this method.

Other prior art systems use wireless technology to track the location of containers within a marine terminal. These systems require some human intervention to locate items, and may have some lag time for data collection. Although some of these described or other prior art systems may provide for tracking parked containers on a chassis (wheeled), it is even more difficult to track stacked containers (grounded).

A system for tracking cargo containers contained within a terminal such as a modern marine terminal that overcomes many of the drawbacks noted above is disclosed in commonly assigned U.S. Patent Publication No. 2006/0220851, filed Aug. 11, 2006 as U.S. patent application Ser. No. 11/201,956, the disclosure which is hereby incorporated by reference in its entirety. The system includes a tag transmitter adapted to be positioned on container handling equipment and operative for transmitting a wireless RF signal based on an event affecting the location of a container handled by the container handling equipment. A plurality of spaced apart access points are positioned at known locations within the terminal that receive the wireless RF signals from the tag transmitter. A processor is operatively connected to the locating access points for geolocating the tag transmitter and determining the container location at the time the event occurs.

In another aspect, a sensor is adapted to be mounted on the container handling equipment and operative with the tag transmitter for sensing an event and transmitting data to the tag transmitter for transmission of event data from the tag transmitter. The sensor is operative for sensing the removal, placement or release of a container, and the height of any gripper located on the container handling equipment to indicate the height of a container when stacked with other containers.

In some cases, it is necessary to verify the position of mobile equipment such as shuttle trucks (STs) and utility tractor rigs (UTRS) at specific points in the terminal. It is also desirable to provide some type of permanent milepost indication at the terminal as a crossing indication, or an X/Y location as a grid-of-tags.

SUMMARY OF THE INVENTION

A system tracks vehicles within a terminal and includes at least one tag interrogator mounted on a vehicle to be identified and tracked within the terminal. The tag interrogator is operative for emitting a signal containing data identifying the vehicle to which the tag interrogator is mounted. At least one tag transmitter is fixed at a known location within the terminal where vehicles are to be identified and receptive to a tag interrogator on the vehicle when the vehicle passes within proximity to the fixed tag transmitter for transmitting a wireless RF signal having data identifying the tag transmitter and identifying the tag interrogator as an identifier for the vehicle to which the tag interrogator is mounted. At least one access point is positioned at the terminal for receiving the RF signal from the tag transmitter for subsequent processing to verify vehicle identity at the known location.

The terminal can be a cargo container terminal and the vehicle could be container handling equipment that handles cargo containers that are moved throughout the cargo container terminal. A container crane can be positioned at the known location to which the vehicle to be identified passes. This container crane can have a plurality of vehicle lanes each having at least one tag transmitter associated therewith for responding to any tag interrogators on vehicles passing through a respective lane and verifying identity of the specific vehicle at a specific lane of the container crane.

The processor is operative with the at least one access point for collecting data from the access point regarding the tag interrogator and tag transmitter and providing a reference location for current and alternate tracking solutions for the vehicle throughout the terminal. The tag interrogator can transmit a magnetic signal carrying identification data that activates the fixed tag transmitter in proximity at the known location for initiating transmission of the RE signal from the tag transmitter.

In yet another aspect, the tag transmitter is formed as a road marker fixed to the ground surface to which the tag transmitter is associated. The road marker comprises a substantially circular configured disk secured to the ground surface and the tag transmitter is mounted within the disk or secured to the underside of the disk. A protective housing can be secured to the underside of the disk and carry the tag transmitter.

In yet another aspect, a plurality of tag transmitters are distributed throughout the terminal and form a grid pattern of tag transmitters.

A method aspect is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
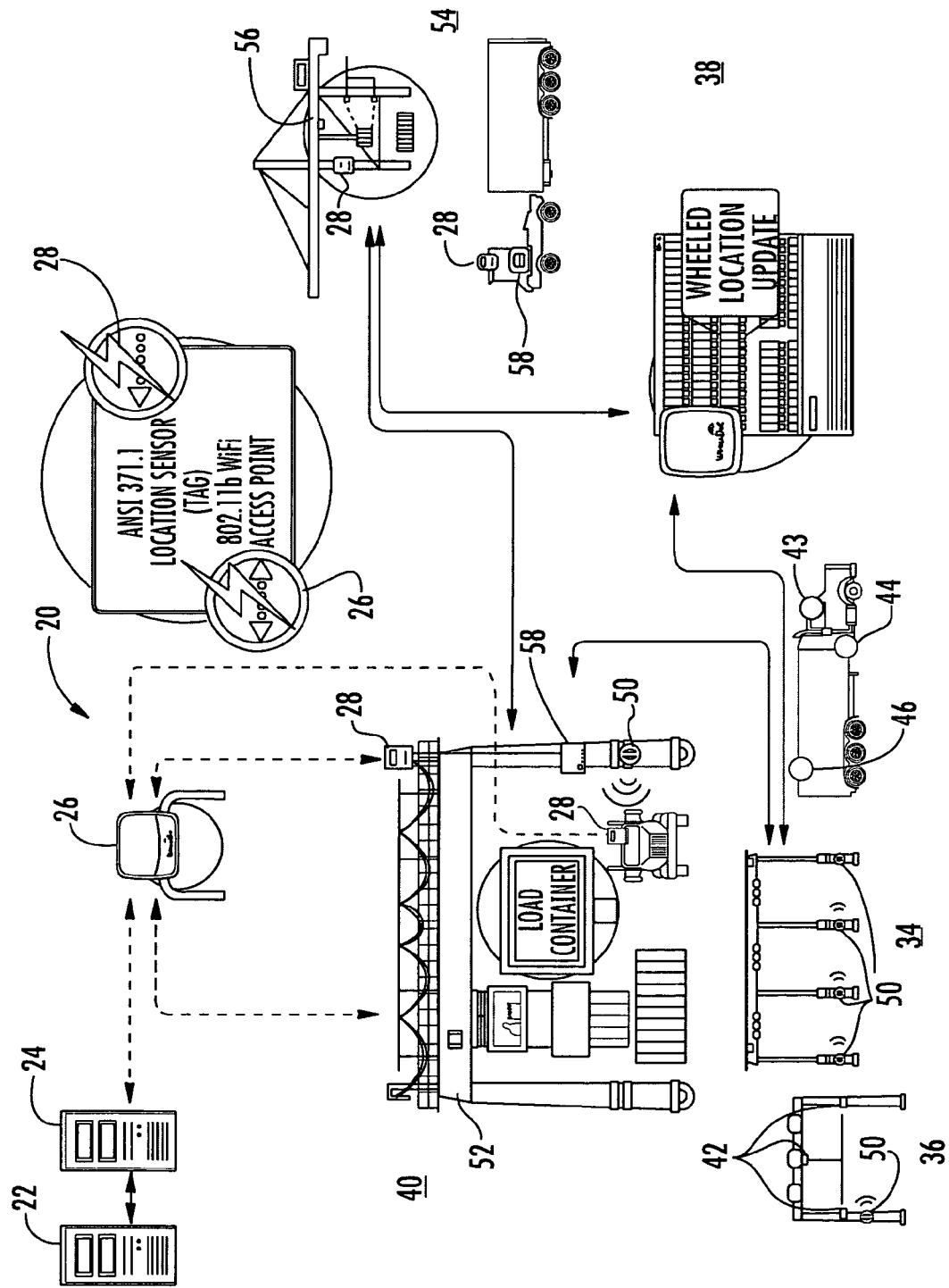
FIG. 1 is a fragmentary, environmental view of a real-time location system for locating containers in a marine terminal.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

In accordance with a non-limiting example of the present invention, different tag interrogators can be applied on shuttle trucks and similar vehicles used in a marine or other terminal. Tag transmitters are attached to the quay or similar cranes to indicate lane positioning of the shuttle truck as a non-limiting example. Tags can be embedded in the pavement, for example, at the shuttle truck transfer area as a non-limiting example. The tag communication link can be independent of a wireless local area network (LAN) because it transmits to location centers on light poles near the berth as a non-limiting example. The embedded tag transmitter system can be used for other purposes.

There now follows a general description of a real-time location system for tracking containers in a marine terminal followed by a more detailed description of different embodiments of the real-time location system using a tag interrogator and embedded or fixed tag transmitters such as on quay or similar cranes or in the pavement in accordance with non-limiting examples of the present invention.

A real-time location system and method that can be modified for use in the system and method of the present invention is described in commonly assigned U.S. Pat. Nos. 6,657,586 and 7,212,563, the disclosures which are hereby incorporated by reference in their entirety. Similar, commonly assigned patents include U.S. Pat. Nos. 5,920,287; 5,995,046; 6,121,926; and 6,127,976, the disclosures which are hereby incorporated by reference in their entirety.

As noted in the '586 patent, GPS can be used with a tag signal reader or locating access point for adding accuracy. Also, a port device as a tag interrogator (either separate or part of a locating access point) can include circuitry operative to generate a rotating magnetic or similar electromagnetic or other field such that the tag interrogator is operative as a proximity communication device that can trigger a tag to transmit an alternate (blink) pattern. The tag interrogator causes the tag to "blink" or transmit, and can be termed such. Such an interrogator is described in commonly assigned U.S. Pat. No. 6,812,839, the disclosure which is incorporated by reference in its entirety.

When a tag transmitter passes through a tag interrogator field, the tag can initiate a preprogrammed and typically faster blink rate to allow more location points for tracking a tagged asset, such as a vehicle hauling a container as it passes through a critical threshold, for example, a shipping/receiving backdoor or gate entry to a marine terminal. Such tags, tag interrogators, and locating access points and associated systems are commonly sold under the trade designation WhereTag, WherePort and WhereLan by Wherenet USA headquartered in Santa Clara, Calif.

A system and method for tracking containers in a marine terminal is first described relative to FIGS. 1-16, followed by a more detailed explanation relative to FIGS. 17-27 of the system and method for tracking vehicles in terminal applications in accordance with a non-limiting example of the system and method of the present invention in which tag interrogators are tracked and work in association with embedded or fixed tag transmitters and provide real-time location and tracking.

FIG. 1 is a fragmentary environmental view of a real-time location system 20 for locating containers in a marine terminal and showing various applications of this real-time location system 20 such as also described in the incorporated by reference U.S. Patent Publication No. 2006/0020851. A computer server 22 is operative with a terminal operating system (TOS) 24. The server 22 and terminal operating system 24 provide a visibility software suite and marine module with a bidirectional terminal operating system interface that is operative with various locating access points 26. The server 22 also provides processing for receiving data signals from the locating access points 26, which had received wireless signals from tags 28. Throughout this description, the tag is also termed tag transmitter or tag transceiver and includes functions as described for transmitting RF signals and receiving signals. The server 22 in this example can be operative as a location processor for determining which tagged signals are first-to-arrive signals and conduct differentiation of first-to-arrive signals relative to the location of locating access points as determined by any global positioning system (if used) in order to locate a tag 28, such as positioned on vehicle handling equipment.

As shown, a locating access point can be operative as an access point 26 with WIFI 802.11b Standards and the tag 28 as a location sensor can use ANSI 371.1 Standards that incorporates communication standards for a 2.4 GHz air interface. The gate 34 could be operative with an OCR terminal 36. A tag 28 is positioned at the gate to improve OCR transactions and track containers to wheeled 38 and grounded 40 positions. The OCR terminal 36 includes different OCR cameras 42. The tag placement options are shown as on a draymen's truck 43, trailer chassis 44 or container 46. At the grounded position 40, a port device 50 is shown positioned on the illustrated crane 52. The tag updates of a wheeled container in the wheeled position 78 could be operative such that no mobile inventory vehicle, magnet or clock update is required. The server 22 and TOS 24 could also provide a user interface for a wheeled location update as illustrated.

In a vessel position 54, a tag 28 could be located with an OCR camera 42 for vessel unloading at a maritime crane 56. It should be understood that the tags can be used to upload maintenance and other information from the vehicle, such as hours of operation and fuel levels.

A telemetry unit, such as a VCOM unit or other position tracking interface unit (PTIU) 58, can transmit sensor data through the tag 28 and can report to the real-time location system 20 when a chassis/container is disconnected from a tractor, such as when the driver parks the chassis/container or other similar events. The PTIU 58 can report to the real-time location system 20 when a chassis/container is disconnected from a tractor, such as when the driver parks the chassis/container. The PTIU or other telemetry unit can transmit data from different sensors on the tractor, for example, a proximity sensor on the king pin, a pair of hydraulic sensors on the fifth wheel, and a reverse sensor as non-limiting example. These three sensors could indicate when a container is engaged or disengaged. Other sensors could be monitored to determine an operator ID, collisions, fuel levels, usage statistics, and maintenance information that can be used to improve operational efficiency.

In the different systems for processing containers through the marine terminal, the real-time location system 10 tracks the location of containers continuously, such that the containers can be found more easily.

Figure 2:
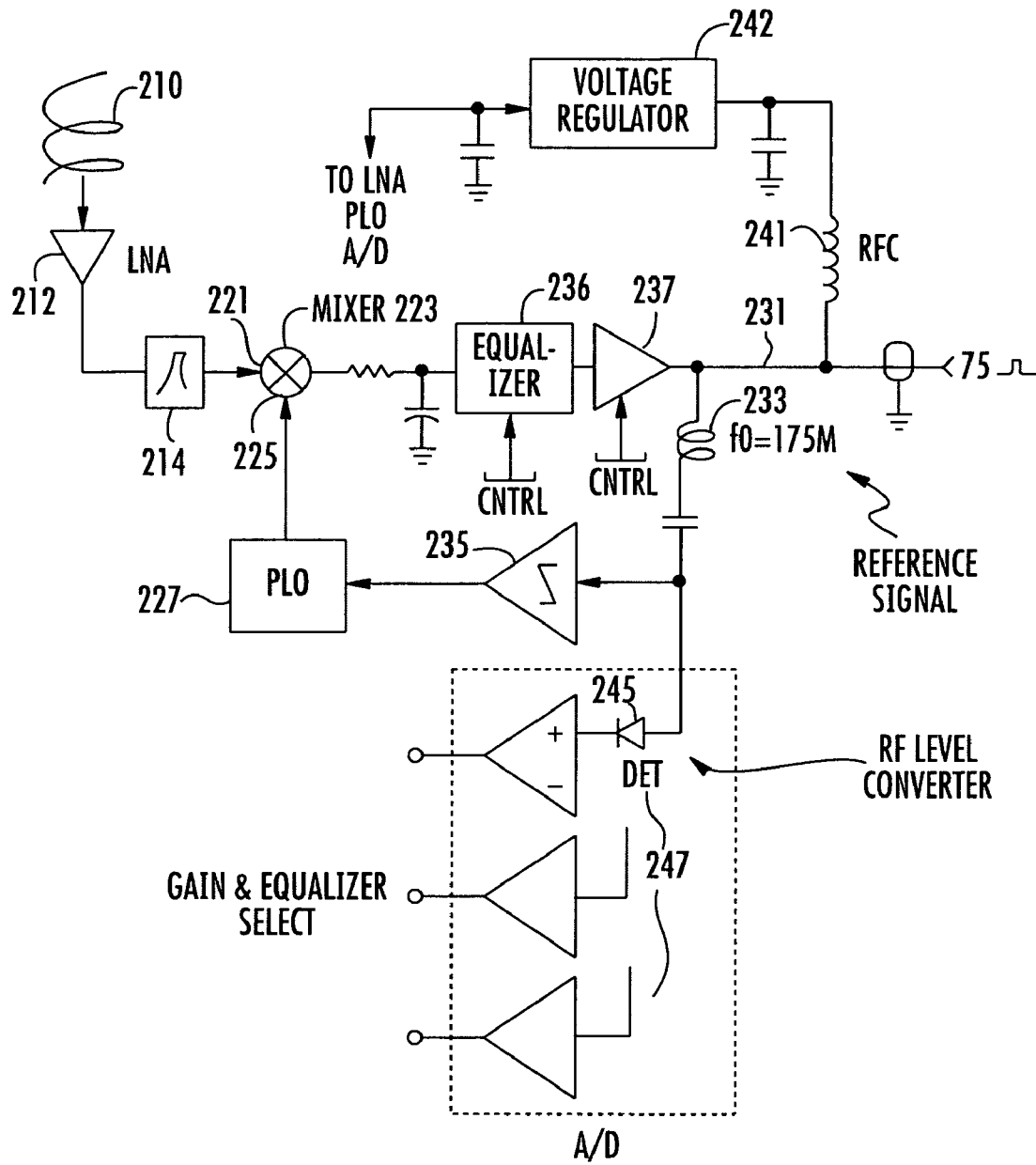
FIG. 2 is a high level block diagram of one example of circuit architecture that can be used for a locating access point.
Figure 3:
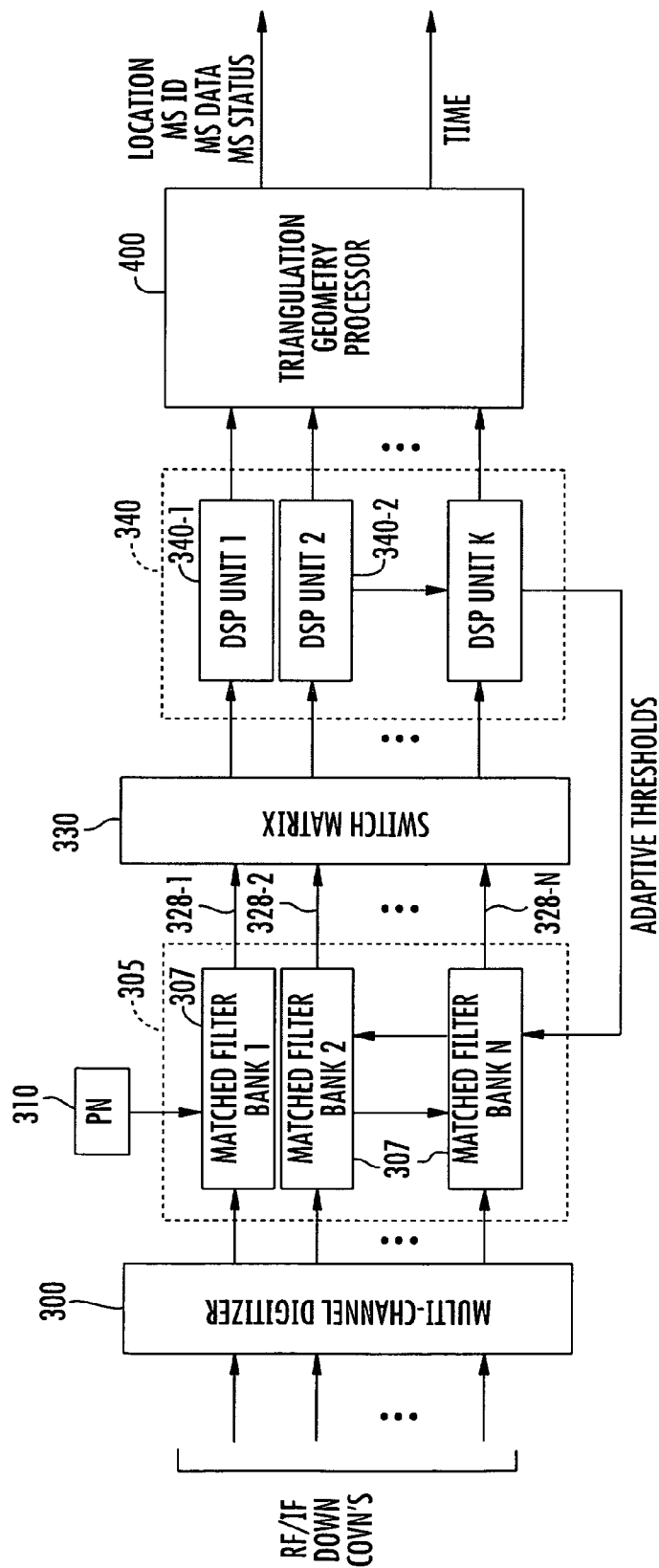
FIG. 3 is another high level block diagram of one example of circuit architecture that can be used for a correlation-based, RF signal location processor.

FIGS. 2 and 3 represent examples of the type of circuits that can be used with modifications as suggested by those skilled in the art for locating access point circuitry and location processor circuitry as part of a server or separate unit to determine any timing matters, set up a correlation algorithm responsive to any timing matters, and determine which tag signals are first-to-arrive signals and conduct differentiation of first-to-arrive signals to locate a tag or other transmitter generating a tag or comparable signal.

Referring now to FIGS. 2 and 3, a representative circuit and algorithm as described in the above mentioned and incorporated by reference patents are disclosed and set forth in the description below to aid in understanding the type of access point and location processor circuitry that can be used for determining which signals are first-to-arrive signals and how a processor conducts differentiation of the first-to-arrive signals to locate a tag transmitter.

FIG. 2 diagrammatically illustrates one type of circuitry configuration of a respective architecture for "reading" associated signals or a pulse (a "blink") used for location determination signals, such as signals emitted from a tag transmitter to a locating access point. An antenna 210 senses appended transmission bursts or other signals from the object and tag transmitter to be located. The antenna in this aspect of the invention could be omnidirectional and circularly polarized, and coupled to a power amplifier 212, whose output is filtered by a bandpass filter 214. Naturally, dual diversity antennae could be used or a single antenna. Respective I and Q channels of a bandpass filtered signal are processed in associated circuits corresponding to that coupled downstream of filter 214. To simplify the drawing only a single channel is shown.

A respective bandpass filtered I/Q channel is applied to a first input 221 of a down-converting mixer 223. Mixer 223 has a second input 225 coupled to receive the output of a phase-locked local IF oscillator 227. IF oscillator 227 is driven by a highly stable reference frequency signal (e.g., 175 MHz) coupled over a (75 ohm) communication cable 231 from a control processor. The reference frequency applied to phase-locked oscillator 227 is coupled through an LC filter 233 and limited via limiter 235.

The IF output of mixer 223, which may be on the order of 70 MHz, is coupled to a controlled equalizer 236, the output of which is applied through a controlled current amplifier 237 and preferably applied to communication cable 231 through a communication signal processor, which could be an associated processor. The communication cable 231 also supplies DC power for the various components of the access point by way of an RF choke 241 to a voltage regulator 242, which supplies the requisite DC voltage for powering an oscillator, power amplifier and analog-to-digital units of the receiver.

A 175 MHz reference frequency can be supplied by a communications control processor to the phase locked local oscillator 227 and its amplitude could imply the length of any communication cable 231 (if used). This magnitude information can be used as control inputs to equalizer 236 and current amplifier 237, so as to set gain and/or a desired value of equalization, that may be required to accommodate any length of any communication cables (if used). For this purpose, the magnitude of the reference frequency may be detected by a simple diode detector 245 and applied to respective inputs of a set of gain and equalization comparators shown at 247. The outputs of comparators are quantized to set the gain and/or equalization parameters.

It is possible that sometimes signals could be generated through the clocks used with the global positioning system receivers and/or other wireless signals. Such timing reference signals can be used as suggested by known skilled in the art.

Figure 4:
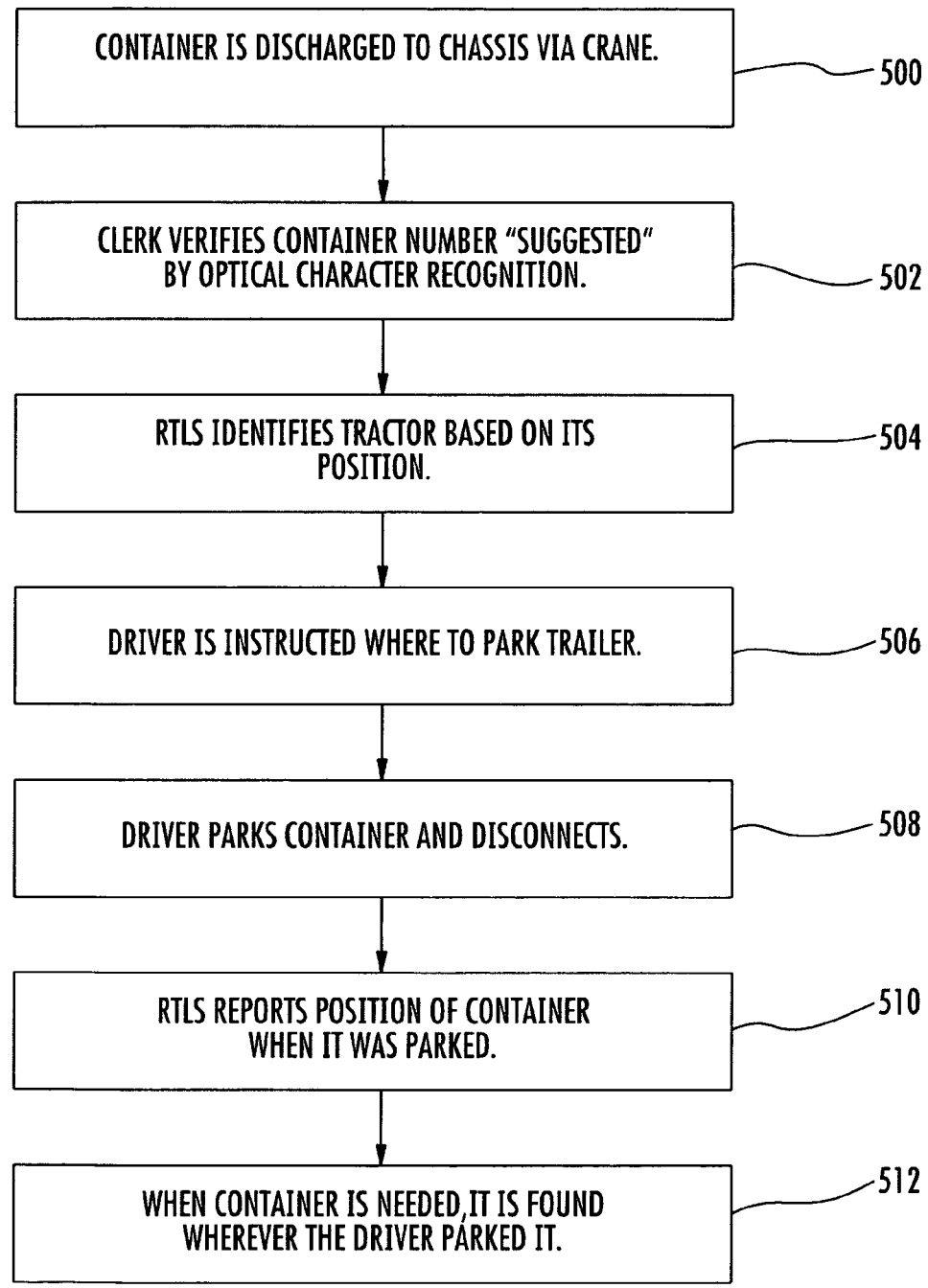
FIG. 4 is a high level flow chart illustrating the steps used when a container is unloaded from a vessel to a chassis.

FIG. 4 diagrammatically illustrates the architecture of a correlation-based, RF signal processor circuit as part of a location processor to which the output of a respective RF/IF conversion circuit of FIG. 3 can be coupled such as by wireless communication (or wired in some instances) for processing the output and determining location based on the GPS receiver location information for various tag signal readers. The correlation-based RF signal processor correlates spread spectrum signals detected by an associated tag signal reader with successively delayed or offset in time (by a fraction of a chip) spread spectrum reference signal patterns, and determines which spread spectrum signal is the first-to-arrive corresponding to a location pulse.

Because each access point can be expected to receive multiple signals from the tag transmitter due to multipath effects caused by the signal transmitted by the tag transmitter being reflected off various objects/surfaces, the correlation scheme ensures identification of the first observable transmission, which is the only signal containing valid timing information from which a true determination can be made of the distance.

For this purpose, as shown in FIG. 3, the RF processor employs a front end, multi-channel digitizer 300, such as a quadrature IF-baseband down-converter for each of an N number of receivers. The quadrature baseband signals are digitized by associated analog-to-digital converters (ADCs). Digitizing (sampling) the outputs at baseband serves to minimize the sampling rate required for an individual channel, while also allowing a matched filter section 305, to which the respective channels (reader outputs) of the digitizer 300 are coupled to be implemented as a single, dedicated functionality ASIC, that is readily cascadable with other identical components to maximize performance and minimize cost.

This provides an advantage over bandpass filtering schemes, which require either higher sampling rates or more expensive analog-to-digital converters that are capable of directly sampling very high IF frequencies and large bandwidths. Implementing a bandpass filtering approach typically requires a second ASIC to provide an interface between the analog-to-digital converters and the correlators. In addition, baseband sampling requires only half the sampling rate per channel of bandpass filtering schemes.

The matched filter section 305 may contain a plurality of matched filter banks 307, each of which is comprised of a set of parallel correlators, such as described in the above identified, incorporated by reference '926 patent, A PN spreading code generator could produce a PN spreading code (identical to that produced by a PN spreading sequence generator of a tag transmitter). The PN spreading code produced by PN code generator is supplied to a first correlator unit and a series of delay units, outputs of which are coupled to respective ones of the remaining correlators. Each delay unit provides a delay equivalent to one-half a chip. Further details of the parallel correlation are found in the incorporated by reference '926 patent.

As a non-limiting example, the matched filter correlators may be sized and clocked to provide on the order of $4 \times 10^6$ correlations per epoch. By continuously correlating all possible phases of the PN spreading code with an incoming signal, the correlation processing architecture effectively functions as a matched filter, continuously looking for a match between the reference spreading code sequence and the contents of the incoming signal. Each correlation output port 328 is compared with a prescribed threshold that is adaptively established by a set of "on-demand" or "as needed" digital processing units 340-1, 340-2, . . . 340-K. One of the correlator outputs 328 has a summation value exceeding the threshold in which the delayed version of the PN spreading sequence is effectively aligned (to within half a chip time) with the incoming signal.

This signal is applied to a switching matrix 330, which is operative to couple a "snapshot" of the data on the selected channel to a selected digital signal processing unit 340-1 of the set of digital signal processing units 340. The units can "blink" or transmit location pulses randomly, and can be statistically quantified, and thus, the number of potential simultaneous signals over a processor revisit time could determine the number of such "on-demand" digital signal processors required.

A processor would scan the raw data supplied to the matched filter and the initial time tag. The raw data is scanned at fractions of a chip rate using a separate matched filter as a co-processor to produce an auto-correlation in both the forward (in time) and backwards (in time) directions around the initial detection output for both the earliest (first observable path) detection and other buried signals. The output of the digital processor is the first path detection time, threshold information, and the amount of energy in the signal produced at each receiver's input, which is supplied to and processed by the time-of-arrival-based multi-lateration processor section 400.

Processor section 400 could use a standard multi-lateration algorithm that relies upon time-of-arrival inputs from at least three readers to compute the location of the tag transmitter. The algorithm may be one which uses a weighted average of the received signals. In addition to using the first observable signals to determine object location, the processor also can read any data read out of a memory for the tag transmitter and superimposed on the transmission. Object position and parameter data can be downloaded to a database where object information is maintained. Any data stored in a tag memory may be augmented by altimetry data supplied from a relatively inexpensive, commercially available altimeter circuit. Further details of such circuit are found in the incorporated by reference '926 patent.

It is also possible to use an enhanced circuit as shown in the incorporated by reference '926 patent to reduce multipath effects, by using dual antennae and providing spatial diversity-based mitigation of multipath signals. In such systems, the antennas are spaced apart from one another by a distance that is sufficient to minimize destructive multipath interference at both antennas simultaneously, and also ensure that the antennas are close enough to one another so as to not significantly affect the calculation of the location of the object by a downstream multi-lateration processor.

The multi-lateration algorithm executed by the location processor could be modified to include a front end subroutine that selects the earlier-to-arrive outputs of each of the detectors as the value to be employed in a multi-lateration algorithm. A plurality of auxiliary "phased array" signal processing paths can be coupled to the antenna set (e.g., pair), in addition to any paths containing directly connected receivers and their associated first arrival detectors that feed the locator processor. Each respective auxiliary phased array path is configured to sum the energy received from the two antennas in a prescribed phase relationship, with the energy sum being coupled to associated units that feed a processor as a triangulation processor.

The purpose of a phased array modification is to address the situation in a multipath environment where a relatively "early" signal may be canceled by an equal and opposite signal arriving from a different direction. It is also possible to take advantage of an array factor of a plurality of antennas to provide a reasonable probability of effectively ignoring the destructively interfering energy. A phased array provides each site with the ability to differentiate between received signals, by using the "pattern" or spatial distribution of gain to receive one incoming signal and ignore the other.

The multi-lateration algorithm executed by the location processor could include a front end subroutine that selects the earliest-to-arrive output of its input signal processing paths and those from each of the signal processing paths as the value to be employed in the multi-lateration algorithm (for that receiver site). The number of elements and paths, and the gain and the phase shift values (weighting coefficients) may vary depending upon the application.

It is also possible to partition and distribute the processing load by using a distributed data processing architecture as described in the incorporated by reference '976 patent. This architecture can be configured to distribute the workload over a plurality of interconnected information handling and processing subsystems. Distributing the processing load enables fault tolerance through dynamic reallocation.

The front end processing subsystem can be partitioned into a plurality of detection processors, so that data processing operations are distributed among sets of processors. The partitioned processors are coupled in turn through distributed association processors to multiple location processors. For tag detection capability, each reader could be equipped with a low cost omnidirectional antenna, that provides hemispherical coverage within the monitored environment.

A detection processor filters received energy to determine the earliest time-of-arrival energy received for a transmission, and thereby minimize multi-path effects on the eventually determined location of a tag transmitter. The detection processor demodulates and time stamps all received energy that is correlated to known spreading codes of the transmission, so as to associate a received location pulse with only one tag transmitter. It then assembles this information into a message packet and transmits the packet as a detection report over a communication framework to one of the partitioned set of association processors, and then de-allocates the detection report.

A detection processor to association control processor flow control mechanism equitably distributes the computational load among the available association processors, while assuring that all receptions of a single location pulse transmission, whether they come from one or multiple detection processors, are directed to the same association processor.

FIG. 4 is an example of a high level flow chart illustrating how the real-time location system 20 as described can be used when a container is unloaded from a vessel to a chassis. Reference numerals begin in the 500 series.

As shown in the flow chart in FIG. 4, a container is discharged to the chassis via crane (block 500). A clerk could verify the container number "suggested" by optical character recognition (block 502), although OCR is not required or desired in some instances. The real-time location system 20 identifies the tractor based on its position (block 504). A driver can be instructed where to park the trailer (block 506). The driver parks the container and disconnects (block 508). The real-time location system 20 reports the position of the container when it is parked (block 510). When the container is needed, it is found wherever the driver parked it (block 512).

Figure 5:
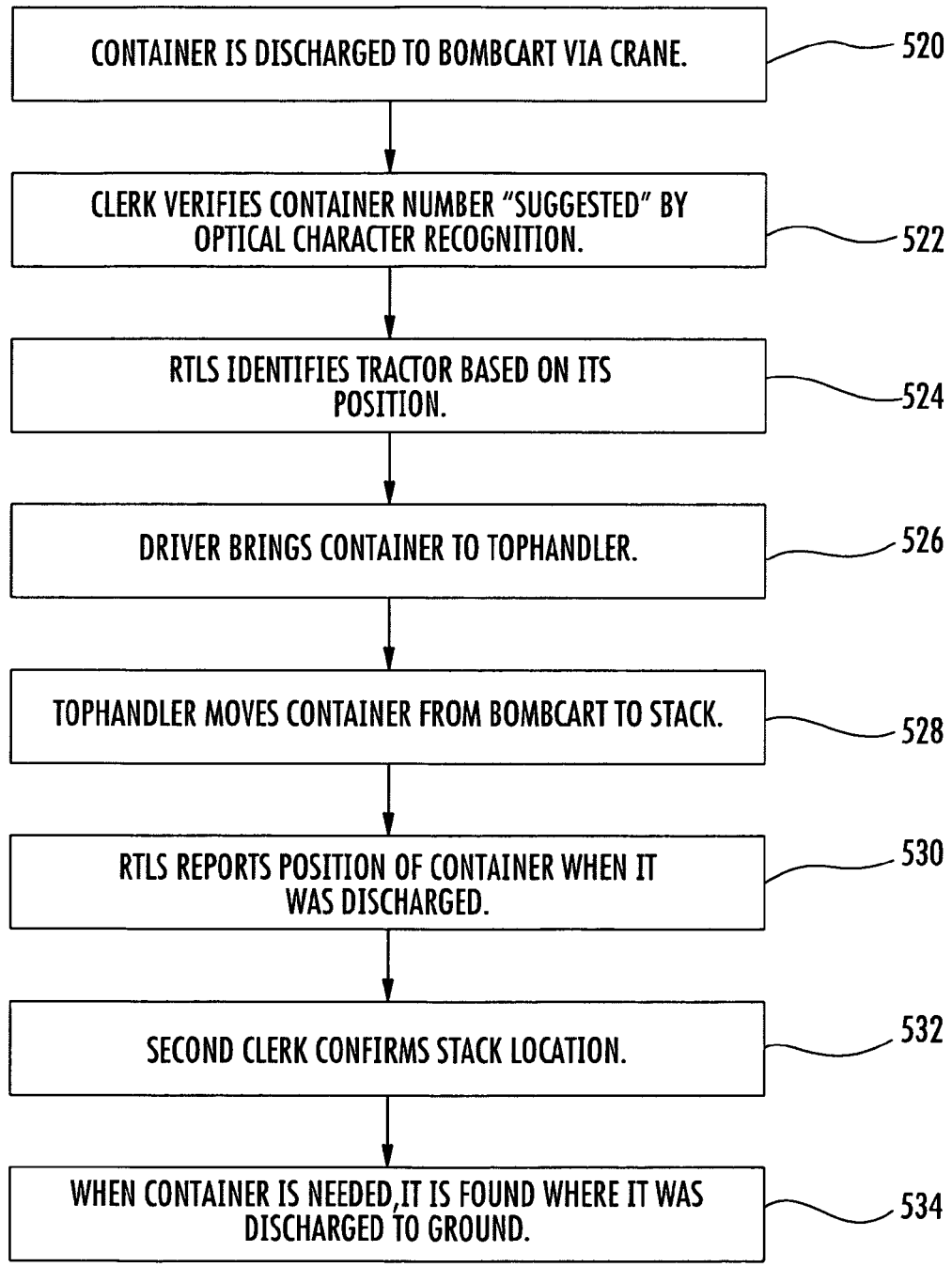
FIG. 5 is a high level flow chart illustrating the steps when discharging a container from vessel to ground.
Figure 6:
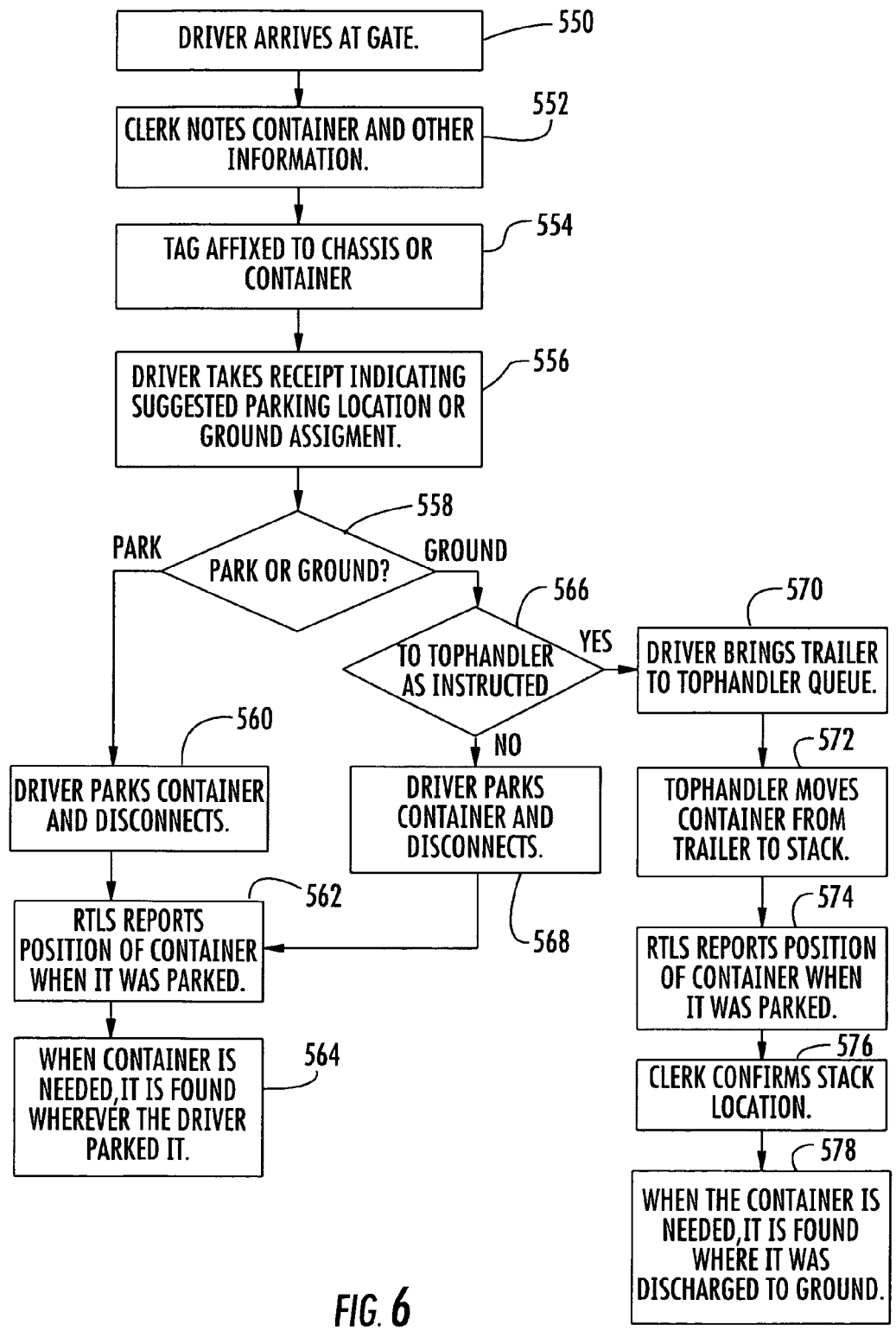
FIG. 6 is a high level flow chart of an example of processing containers through a gate of the marine terminal.

FIG. 5 shows a flow chart used when discharging from vessel to ground, in one non-limiting example. A container is discharged to a bombcart as a non-limiting example via crane (block 520). A clerk verifies the container number "suggested" by optical character recognition (block 522), although OCR is not required or desired in some instances. The real-time location system 20 identifies the tractor based on its position (block 524). A driver brings the container to a top handler (block 526). The top handler moves the container from the bombcart to the stack (block 528). The real-time location system 20 reports the position of the container when it is discharged (block 530). Another clerk could confirm stacked location (block 532). When a container is required, it is found where it was discharged to ground (block 534).

The real-time location system 20 for tracking containers in a marine terminal as described can also be used when processing containers through a gate of the terminal, which involves similar issues as discharging containers from vessel to chassis and from vessel to ground. Drivers entering through a gate can be instructed to park a chassis/container or to discharge the container to ground. A large number of tractors and chassis enter from the outside and some drivers and equipment do not always belong to the terminal and are not permanently tagged. As shown in the example high level flow chart of FIG. 6, additional step(s) can be added for check-in. A temporary tag can be affixed to a chassis or container as it enters the gate.

As illustrated, a driver arrives at the gate (block 550) and a clerk notes the container and other information (block 552). A tag is affixed to a chassis or container (block 554) and the driver takes receipt indicating the suggested parking location or ground assignment (block 556). A determination is made whether it is parked or grounded (block 558). If the determination is made to park, the driver parks the container and disconnects (block 560). The real-time location system 20 reports the position of the container when it was parked (block 562). When a container is required, it is found wherever the driver parked it (block 564). If a decision at block 558 was made for a grounded container, a determination is made whether the container went to the top handler as instructed (block 566). If not, the driver parks the container and disconnects (block 568) and the process continues such that the real-time location system 20 reports the position of the container when it was parked (block 562).

It the top handler was instructed at block 566, the driver brings the trailer to a top handler queue (block 570). The top handler moves the container from the trailer to stack (block 572). The real-time location system reports the position of the container when it was parked (block 574). The clerk confirms the stacked location (block 576). When the container is required, it is found where it was discharged to ground (block 578).

The infrastructure, tracking devices and software as described can support the tracking of container handling equipment (CHE) and third party truckers (draymen) via a gate 34 to enable an automated hand-off of the container ID to a terminal operating system (TOS) 24. The real-time location system 20 can support an automated update of the ground position 40 of a container in the terminal, whether it is delivered by a truck or UTR (utility tractor rig) to system enabled Front End Loaders (FEL). A flow process for a draymen for gate to ground could include a permanent or temporary mount real-time location system tag 28 on the draymen tractor or chassis. This tag 28 could be triggered by a port device 50 as the chassis passes through an optional optical character recognition (OCR) portal 36, which could automatically associate the tagged ID to an OCR record.

A tag interrogator 50 could be located in each gate lane of the gate 34 for automatic tag/transaction association and could assign an OCR portal transaction to the correct lane. A front-end loader could have a tag interrogator 50 that forces the draymen or chassis tag to transmit its ID and the associated container ID could be automatically transferred to the Front End Loader. This could be tracked until the container is grounded. Sensor information collected by a Position Tracking Interface Unit (PTIU) 58 or similar telemetry unit could collect sensor information and transmit it via the Front End Loader's tag in a manner described before. Sensor information could be received and the X,Y position for the Front End Loader tag could be determined upon container disengage. At the marine terminal server 22, the location of the sensor information could be translated to a bay, cell and tier position and updated to the terminal operating system 24.

For a gate to wheels scenario, the real-time location system 20 could compare a park instruction with a park signature created by a draymen visiting the marine terminal. For example, a permanent or temporary tag could be located on the draymen's tractor or chassis and the tag read by the tag interrogator 50 as the draymen passes through an optional OCR portal 36, which automatically associates the tag ID for an OCR record. A tag interrogator 50 could be located at each gate lane at the gate 34 for automatic tag/transaction association and assigning the OCR portal transaction to lanes. The processing for the container can be learned by querying the Terminal Operating System 24, tracking the container, and monitoring it to ensure a grounded instruction is adhered. The draymen could leave the container in the chassis or bear the chassis into the marine terminal. The tag's position is automatically determined with no need for a mobile inventory vehicle or magnet retrieval. A wheeled position is updated to the Terminal Operating System.

The real-time location system 20 is also operative for a vessel or rail-to-ground and supports an automated association of the container ID at the vessel for tracking a container ID to a wheeled or grounded position 38,40 in the yard of the marine terminal. The container ID can be associated to the UTR in this example. For example, a quay crane 52 OCR or rail OCR portal could be used to automatically capture a container ID and the container and UTR are automatically associated based on UTR sensor sweep and location. A tag interrogator on a transtainer and a UTR tag automatically transfer ownership of the container to the transtainer. The transtainer is located and the container disengaged to determine an X,Y position. Other sensors, for example, operative with the PTIU 58 could be used to determine a Z position, as explained in greater detail below. The transtainer disengaged location can be translated to a bay, cell, tier position, or other position for the container and updated to the Terminal Operating System 24.

The system as described can also be used for vessel or rail-to-wheels in which the quay crane OCR or rail OCR portal automatically captures the container ID. The container and UTR are automatically associated based on UTR sensor sweep and location. The UTR's location can be recorded upon chassis disengage and the UTR automatically shows is available for its next assignment. The UTR's disengaged location can be translated to a row or slot position for the container and updated to your TOS.

The Position Tracking Interface Unit (PTIU) 58 can be located on UTR's, side handlers, top handlers, reach stackers, straddle carriers, RTG's and other container handling equipment, and can transmit equipment sensor data through the tags 28 into the Real-Time Location System 20 for processing by the server 22. Sensor transmissions can be simplified by providing a common platform for the container handling equipment. The PTIU 58 can monitor what equipment is moving, who was using the equipment (with operator logon), what the equipment is doing, such as idling or moving a container, and other diagnostic data, such as fuel level while the equipment is in operation. The PTIU 58 can respond to events allowing the real-time location system 20 to update what that specific equipment did when the PTIU 58 sends data to a tag 28. For example, when the operator of a RTG moves the RTG spreader, no events are sent to the real-time location system 20. When an operator locks the spreader on a container, however, the PTIU 58 sends this event data to the real-time locating system 20 because it affects the location of container inventory.

The PTIU 58 can monitor any required sensors and respond to correct events that affect container inventory. For example, for a top handler or RTG, the events of locking onto a container and moving the container could be similar, although sensors sense this as different. For a UTR, the monitored events could be the fifth wheel being engaged/disengaged and the presence of a container. The events and sensors used may be different depending on the container handling equipment.

Figure 7:
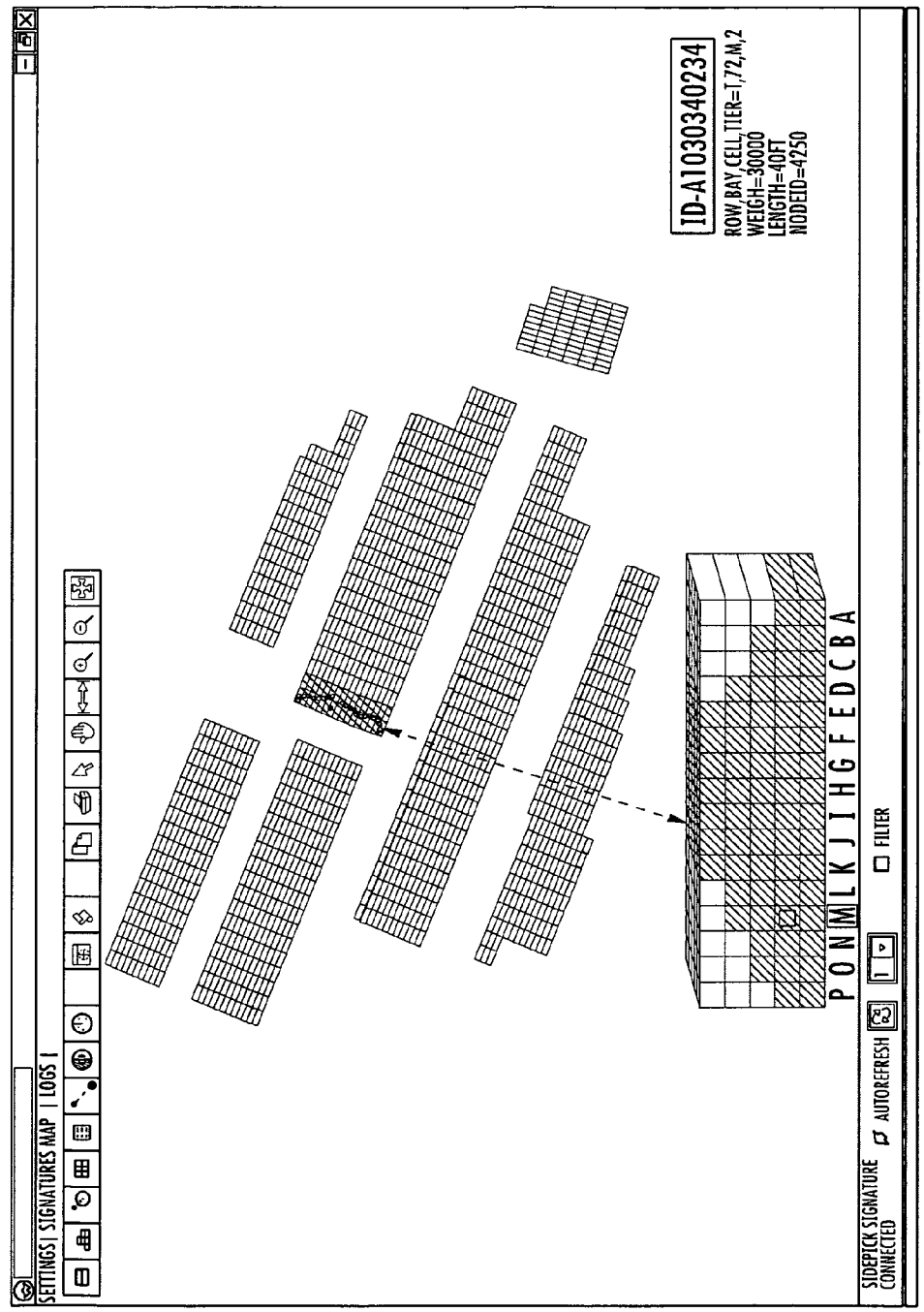
FIG. 7 is an example of a computer window as a graphical user interface for a container stacking console.
Figure 8:
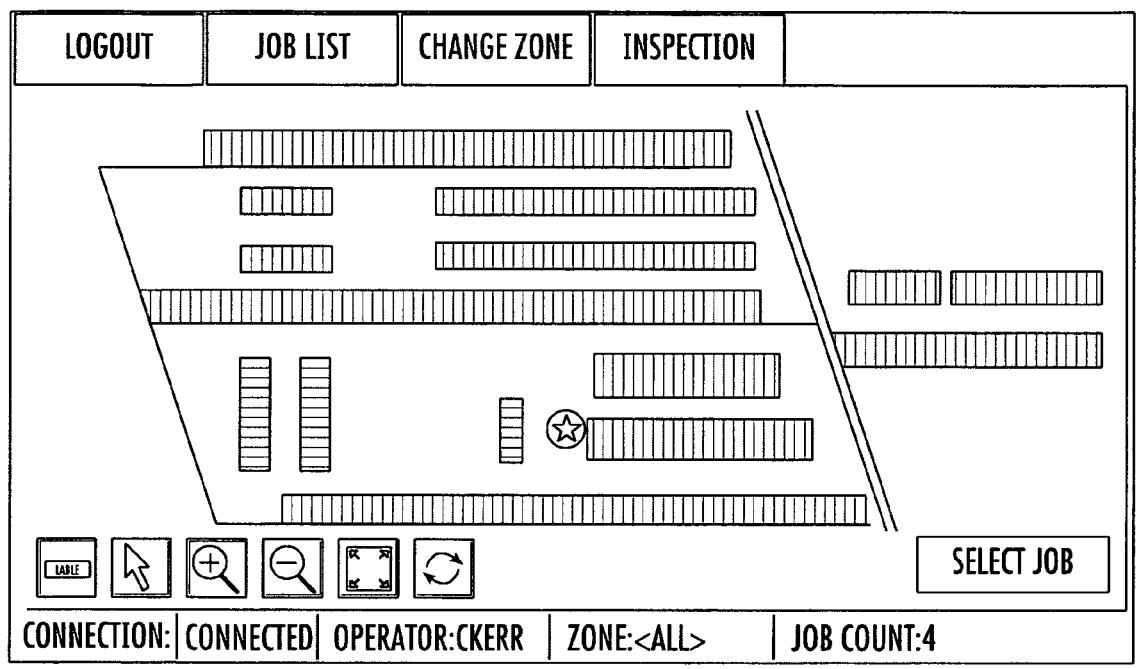
FIG. 8 is an example of a computer window as a graphical user interface for a switcher user interface.

The server as a location processor can include appropriate software to process data received from the PTIU 58, such as to provide an open computer window corresponding to a signature processing console for each type of container handling equipment located in the marine terminal. A new position for a container can be translated from an X, Y, Z position in the terminal to a row, bay, cell and tier position and passed through the Terminal Operating System 24. An example of an open computer screen window for a container stacking console is shown in FIG. 7, showing a layout of different container positions in the top portion of the window and an isometric representation of stacked containers in the lower portion, as selected and indicated by the dashed lines, Location information can also be shared with UTR drivers or other operators of container handling equipment and a user interface could be leveraged with a switcher user interface as shown in FIG. 8.

As noted before, the real-time location system 20 as developed in the system and method can identify ISO containers arriving at the marine terminal with tag interrogators 50 as described before, and locate these containers when they are stored on flat trailers, e.g., chassis, in the main staging yard as wheeled operations. The containers can arrive through a main gate and be scanned by tag interrogators 50 as described above, or by rail and loaded by transtainers, as also described above, or arrive by ship and loaded by cranes onto a UTR-pull chassis in a similar process to a rail process. These "wheeled" containers are parked in the yard, for example, by the incoming drayage driver (draymen), or by a longshoreman hosteller (UTR) driver. The real-time location system 20 maintains a constantly updated ID and location record of all wheeled containers located in the yard.

Figure 9:
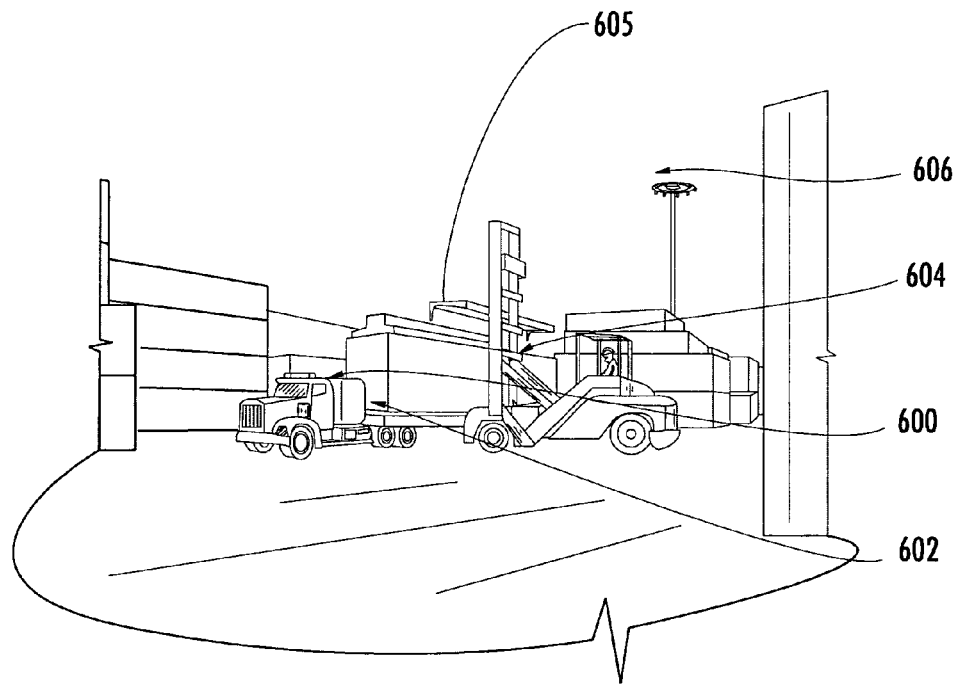
FIG. 9 is an environmental view of a top pick, drayage tractor and chassis with the top pick unloading the container.
Figure 10:
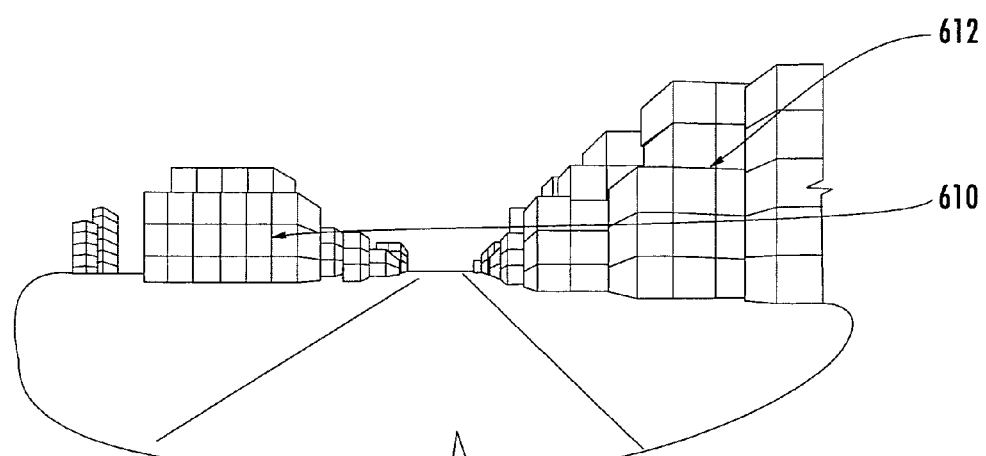
FIG. 10 is an environmental view showing stacked containers.

Most wheeled operations use a chassis that is tagged. Containers arriving into the yard on non-owned chassis could be off-loaded by a "top pick" (e.g., also referred to as a "top pick spreader") loader and stacked on the "ground" so that the outside draymen can take the chassis as it leaves. FIG. 9 shows a drayage tractor 600 having a tag, and a marine terminal owned chassis 602 with a tag. The top pick is illustrated at 604 within a horizontal top pick spreader 605 for grabbing containers and the locating access point (LAP) is shown generally at 26. The antenna mast 606 supports the LAP. The antenna mast 606 and LAP could include a GPS unit. The ID and location of each container in the "grounded stack" to its exact position in X, Y, Z coordinates is preferred, especially when there are many stacked containers as shown in FIG. 10, showing full containers generally at 610 that are stacked "four high" and empty containers generally at 612 that are stacked "five high."

Figure 11:
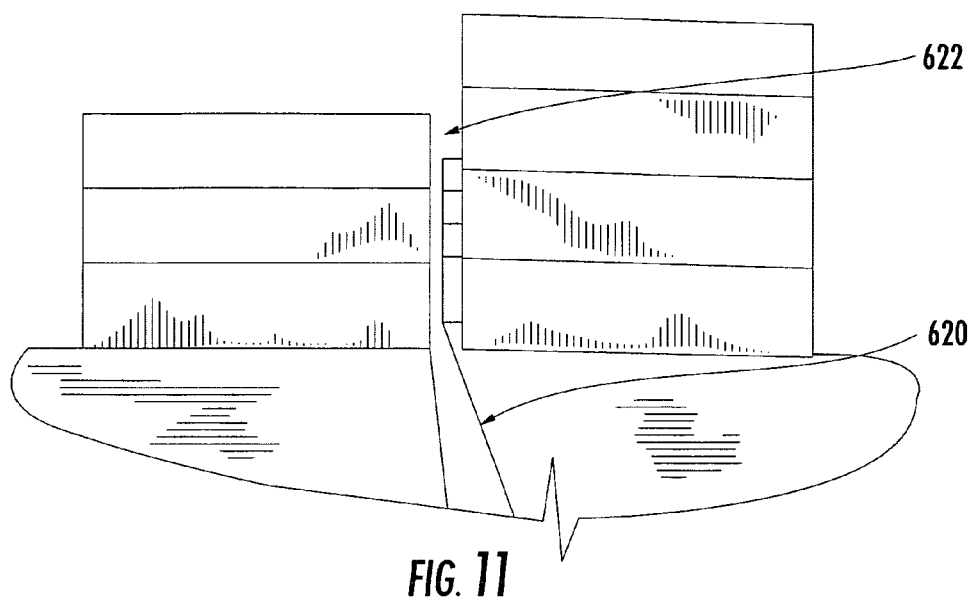
FIG. 11 is an environmental view showing stacked containers and a gap between containers for top pick spreaders.

The grounded containers normally, but not always, have their positions marked on the pavement as shown by the position lines 620 of FIG. 11. In one non-limiting example, the containers are 8.5 feet wide, 8.5 to 9.5 feet high, and have 20-foot, 40-foot, 45-foot and 48-foot lengths. Spacing between the stacks made by any top pick loaders typically have a minimum of about 1.5 feet for transtainers that have a greater spacing to accommodate the rail-guided loader as generally shown by the spacing 622 between the two stacks of containers. In one non-limiting example, stacks can be five containers high for empty containers, which typically are about 80% of outbound containers, because the U.S. does not export many containers. Full containers can be stacked up to four high and the stack depth can be variable. The 1.5 foot gap 622 is usually left between the containers for top pick spreaders with port devices on the ends of the spreader that must fit in the area and not be damaged. The chalk outline 620 shows the marked outline of the storage area for containers.

Figure 12:
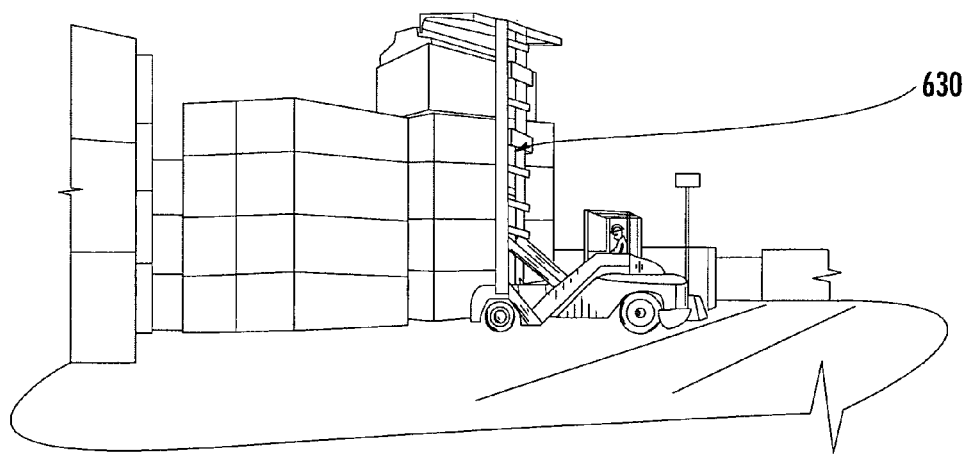
FIG. 12 is an environmental view showing a top pick placing a container on top of a stack.

Load and unload operations can be performed quickly, allowing container locations that are associated with loader locations to be captured in less than two seconds to avoid errors in one non-limiting example. As shown in FIG. 12, the highest fixed point 630 on the top pick spreader is above the top of the third level container, about 30 feet. Because much of the marine terminals in the world are grounded for yard space and input/output efficiency, the grounded operations are becoming increasingly important.

Figure 13:
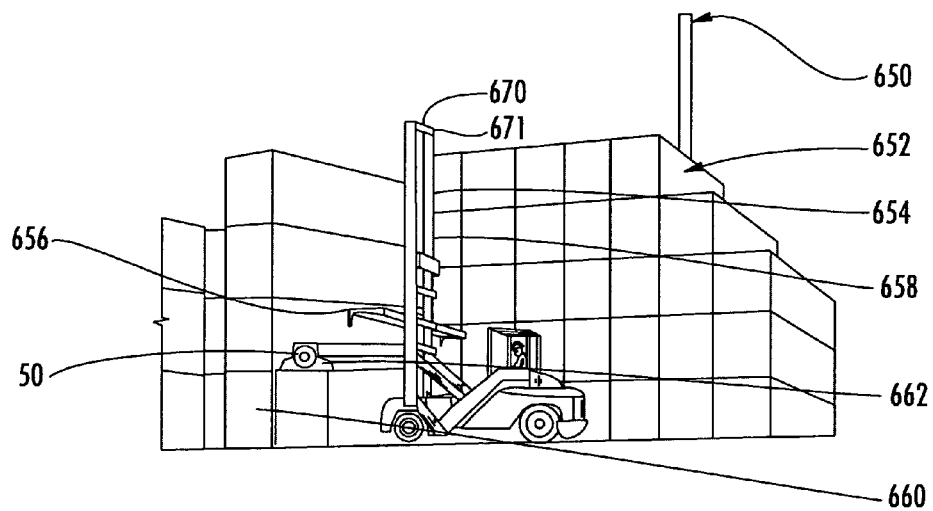
FIG. 13 is an environmental view showing a top pick moving a container and a vertical antenna positioned on the top pick.

Although it is possible to include tags on containers, the location of the containers can be inferred from real-time association with the container handling equipment, which places and removes them from the grounded stack and carrier chassis. FIG. 13 shows an antenna 650 locating access point, 8 ½ foot stacked containers 652, an 18-foot vertical whip antenna on the top pick spreader 654 with the point shown at 656 on the top pick spreader for mounting the antenna, and 9 ½ foot containers 660. The whip antenna for a tag transmission could be formed instead as a mast, which supports a set of tags as explained below. Port devices 50 as interrogators can be positioned on each end of the top pick spreader bar as indicated generally at 662 for scanning a tag positioned on a carrier chassis.

It should be understood that sensors on the handler can indicate the placement of a container, the release of a container, and the height of a gripper when an action occurs (Z dimension value). This information could be sent with telemetry data from a PTIU 58 using the tag 28 and simultaneously associating the container handling equipment location with the data for the transaction. A tag interrogator 50 induces the blink from the chassis tag and/or the drayage tractor tag to associate the container ID with the data from the handler tag.

Non-marine terminal chassis can be pulled by non-tagged drayage tractors and can be manually entered at the terminal from a video photo of a painted-on container number taken during a transaction. This photo could be automatically requested from the container handling equipment, over the local area network that forms part of the real-time location system 20, if no tag interrogator 50 induced blinks with the correct port device ID were detected during the chassis placement. Optical character recognition (OCR) could be used, but may not be desirable because gate operations using OCR have demonstrated only about a 95% scan success rate. Also, the vibration of the handler could degrade the OCR performance even more than stable gate scanners. A two-second association window created by a handler quick movement could cause further degradation of OCR performance.

Because the handler moves quickly, the tag on the handler could include a set of tags to ensure instantaneous location accuracy. For example, three tags 28 as RF emitters or transmitters could be simultaneously triggered by a telemetry unit from recognized handler transactions. These tags could be set for a minimum trigger delay of about 600 milliseconds with standard multi-tag scan dither on the trigger. Each tag could produce four sub-blinks with a normal 125 millisecond dithered spacing, creating a maximum time diversity within the short burst window. Three, one-quarter wavelength, tags 28a, 28b, 28c could be mounted near the corners of a triangular mounting plate 670 forming a counterpoise as shown schematically in FIG. 14. This plate 670 provides a ground plane and prevents reflections from containers below. The plate 670 is mounted on the mast 654 in one non-limiting example. The tags are typically spaced about ¼ wavelength. This type of configuration could provide spatial diversity with a minimized radio frequency radiation below the antenna radiator horizon. This configuration could also minimize some multipath from containers and other metal objects below the emission point height. The three RF transmitters can provide some filtering also.

Because the location of the handler must be as accurate as possible, the typical RF emission from the handler tag should be line-of-sight in a preferred embodiment to the existing infrastructure of the real-time location system 20. This is accomplished using the separate antenna mast 654 on the handler to rise above the top plane of the stacked containers. An existing 18-foot fiberglass antenna mast as used for vertical diversity on yard light poles in the marine terminal could be used. The triangular mounting plate 670 supporting the tags at the top and a new mount for attachment to the highest fixed location on the top pick spreader. The transtainers are high and the mast should clear the surrounding structure of the loader. Some mechanical flexibility could be provided on the top pick spreader for overhead obstacles, such as maintenance garage doors and overhead utilities and conveyors. A GPS sensor 670 could also be located as mast 654 to provide additional location ability and redundancy overlay. When the GPS is blocked, the RTLS 20 could be used, or both GPS and RTLS 20 used. If the RTLS infrastructure is blocked, the GPS could provide location.

Figure 15:
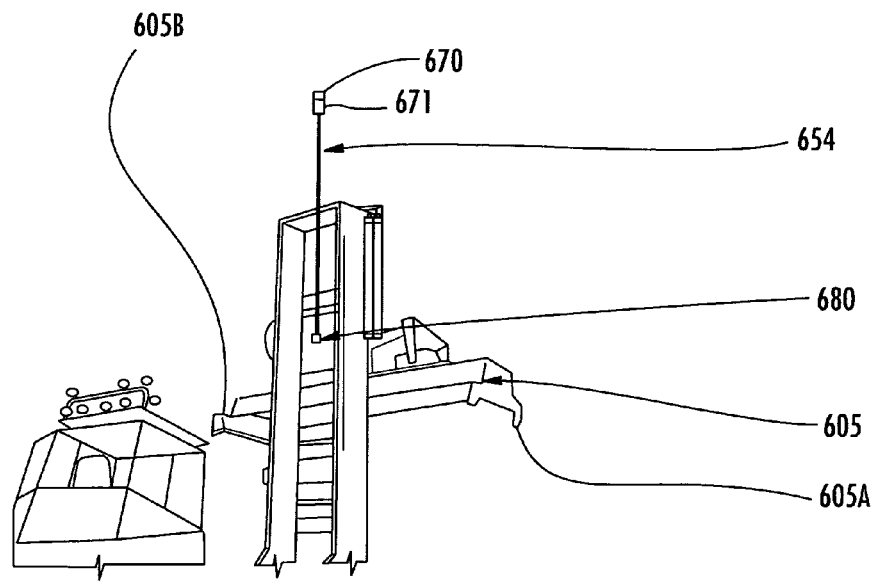
FIGS. 15 and 16 are environmental views of a top pick and its top pick spreader showing the antenna mast in FIG. 15.
Figure 16:
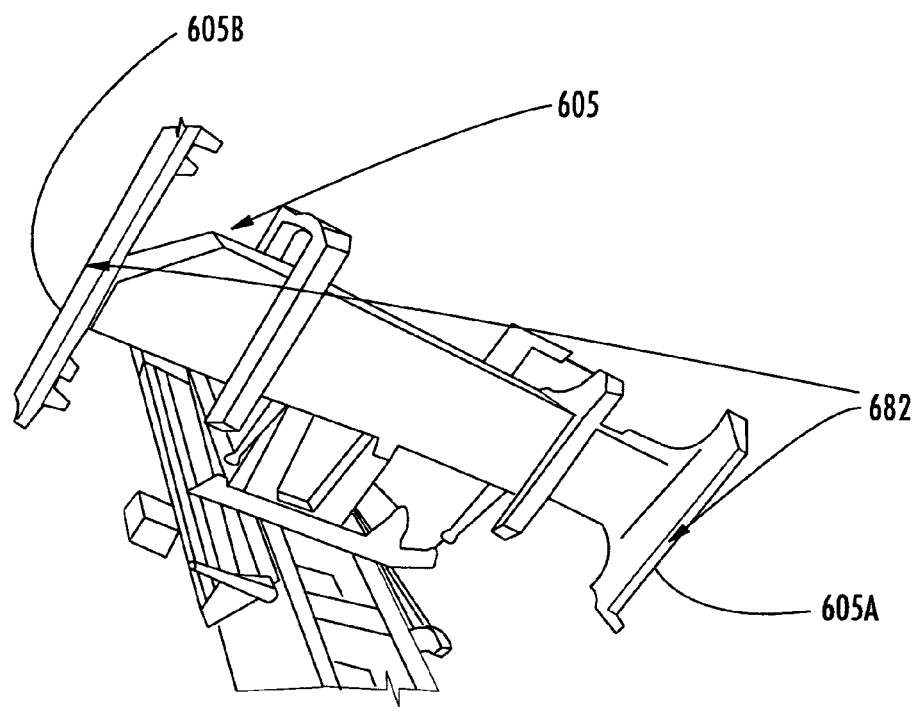
Figure 14:
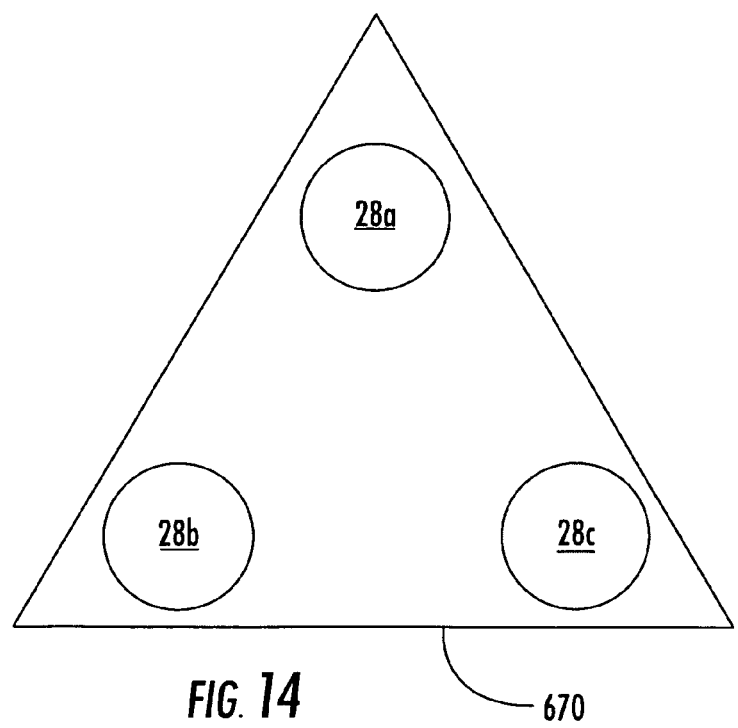
FIG. 14 is a fragmentary plan view of a mounting plate for three tags located on top of the top pick antenna mast.

FIGS. 15 and 16 show two views of a top pick spreader 605 having an 18-foot antenna mast 654 with a bar 680 for an antenna mount, and tag interrogator 50 mounting points 682 (FIG. 16). The tag interrogator 50 should be mounted at both ends of the top pick spreader 605 at its gripper 605*a*, 605*b* on either end because orientation to the tagged end of a container on a chassis is unknown. The port devices 50 should be mounted under a spreader and plate to prevent damage from adjacent containers during placement and removal operations from the stack. Electrical connection to a port device antenna should be flexible enough to accommodate 20-foot to 45-foot container width handling.

The location accuracy in a grounded stack should typically be about +/−10 feet (for 20-foot containers) for container length, and about +/−4 feet for container width. The Z dimension in the stack is typically up to about five containers high. Occasionally, containers will be temporarily grounded in areas other than the marked, grounded stacks. These containers should be identified as not in a stack, but actual location indication could be zone only. Tag interrogators 50 can be used to associate containers on marine terminal chassis and/or with tagged drayage tractors with loaders. Association with containers on chassis, pulled by untagged draymen, is a challenge as previously described. This could result from the structure of the top pick and the combination of the tractor, container and chassis.

In one non-limiting example, containers arriving on tagged marine terminal chassis and/or pulled by tagged drayman are tracked, and untagged transactions by OCR or video camera are not required.

A PTIU 58 or similar module can be connected to top pick sensors for (a) container pick (removal); (b) container release (placement); and (c) height of operation. A special tag could include: (a) data input and blink trigger; and (b) 50 ohm RF output connector.

The RF antenna mast with mounting plate 670 used on the top pick could include the three element radiator formed by three tags 28*a*, 28*b*, 28*c* with sufficient separation for: (i) minimized coupling and pattern distortion; (ii) adequate spatial diversity; and (iii) minimum footprint to the top mount on the antenna mast. This RF antenna could also include an upward hemispherical pattern with minimized radiation below the horizon of the counterpoinse and a mast long enough for a two-foot rise above the plane of highest container stack. Special tag interrogators 50 can be used with top pick, and include different circuits and structural functions, for example, (a) pot and shock mount electronics; (b) a separate antenna; (c) a flexible connection cable to the ends of the spreader; (d) a weather shield; (e) damage protection; and (f) verify port device coverage in the environment.

Both magnetic compass and inertial navigation techniques can be used for optimization of loader position information. Application specific location algorithms can be used for: (a) X, Y, Z location of all containers in the grounded stack and zone location when not in stack; (b) discerned placement and removal operations from the stack; (c) associated tags on the chassis and/or drayage tractor, and therefore, a container ID with containers placed or removed by top pick; and (d) the associated three tags in a tag set, which are tied to each top pick event for improved location accuracy, allowing blinks to be sent in less than a 1.5 second window. Application software can be used for location of all containers in the grounded stack and stored in the asset manager, and an isometric display of container in exact current form stack from planar map zoom.

Reference is now made to FIGS. 17-27 in which non-limiting examples as shown for the system and method of identifying the location of vehicles such as at choke points in the marine or other terminal. In accordance with a non-limiting example of the present invention, the position of mobile equipment such as shuttle trucks (STs) and utility tractor rigs (UTRs), as non-limiting examples, can be verified at specific choke points at the terminal, for example, a marine terminal as described above. "Port devices" as tag interrogators are placed on shuttle trucks and similar vehicles and each have an ID for identifying the interrogator. For example, in one non-limiting example, four tag interrogators are positioned per shuttle truck for a total of 80 tag interrogators on a 20-unit shuttle truck fleet used in a marine terminal, Two tag interrogators could be mounted near the bottom of the shuttle truck and two tag interrogators could be mounted near the top of the shuttle truck in a non-limiting example, which would give an adjustable radius of about 1 to 20 feet from the shuttle truck.

Figure 17:
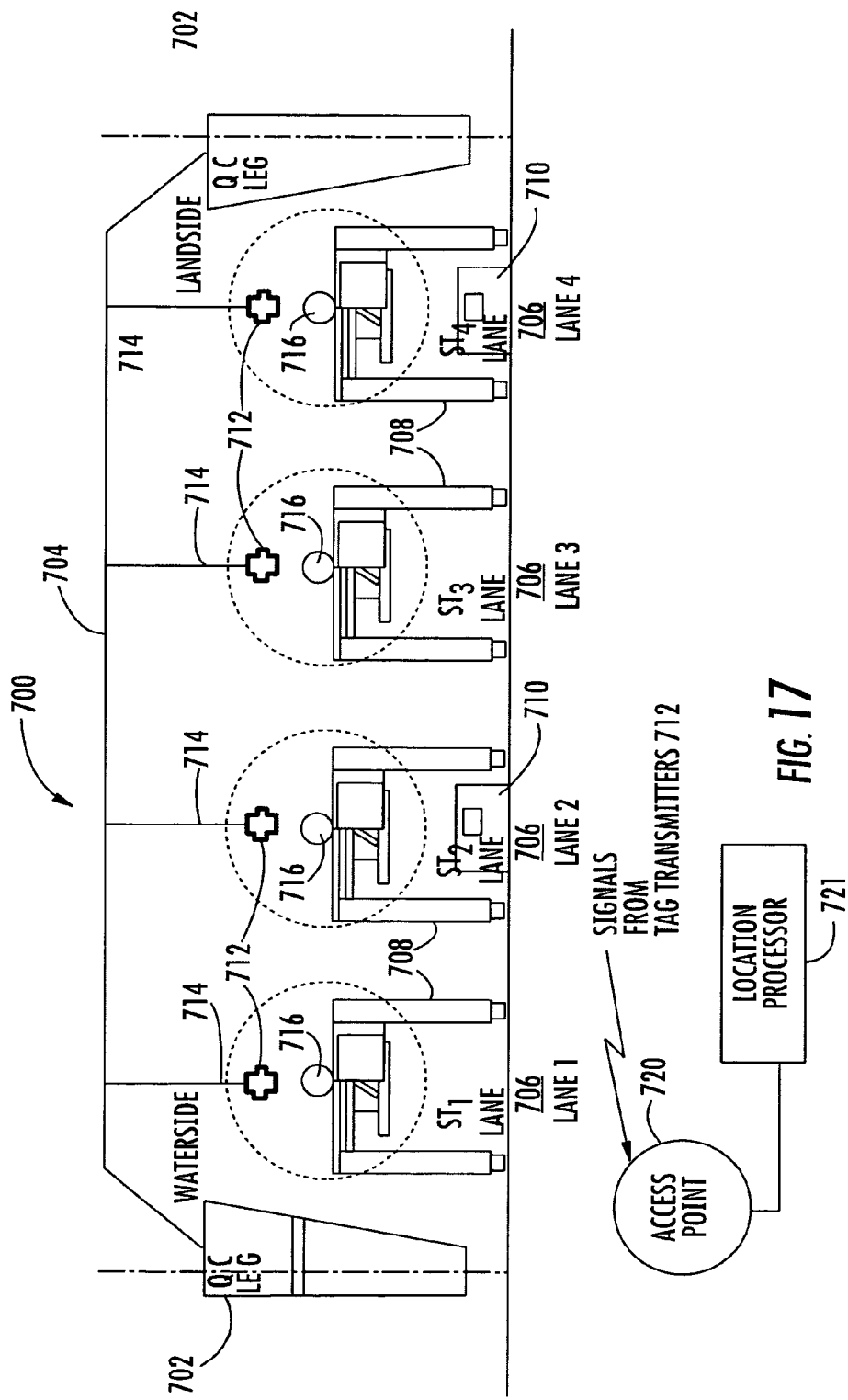
FIG. 17 is a fragmentary front elevation view showing different vehicle lanes at a quay crane or rail-mounted gantry (RMG) crane and showing locations of different tags and tag interrogators (port devices) in accordance with a non-limiting example of the present invention.

Referring now to FIG. 17, a ship-to-shore (STS) container crane, also known as a quay crane (QC) 700 is illustrated and typically positioned parallel to a band of water and includes a waterside and landside. The crane 700 includes crane legs 702, a sill beam 704 at the top and a waterside and landside as described. Four shuttle truck lanes 706 are illustrated with respective shuttle trucks 708 positioned in each lane. Respective safety lanes can be formed for ensuring proper guidance of shuttle trucks and movement. A container 710 is illustrated in lanes 2 and 4 and could include any necessary identifier or tag. Tags are operative as tag transmitters 712 and attached to the quay crane 700, for example, on its sill beam 704 and hung from support pipe 714 the lane positions where the shuttle truck 708 passes under the quay crane 700. For example, there could be four shuttle truck lanes 706 as illustrated for a quay crane and two crane ends, and a yard having six quay cranes, resulting in a need for 48 tags 712. Some of these tags could be embedded in pavement at the quay crane transfer area, for example, at the waterside end. The tag communications link is independent of any wireless local area network. For example, the link could transmit to two location sensors as access points that are mounted on light poles near the crane berth as a non-limiting example.

As noted before, four tags 712 are supported by the sill beam of the quay crane 700 at each shuttle truck lane and at each end of the respective lane for a total of eight suspended tags for this quay crane. Four tags are illustrated hanging from the sill beam in FIG. 17, while the four tags that are not shown are positioned at the other end of the quay crane. A tag interrogator 716 is placed on top of each shuttle truck 708 as illustrated and activates the respective tag 712 in the respective lane. The local sensor as an access point 720, such as on a light pole, receives the lane ID and shuttle truck ID based on the tag interrogator on the shuttle truck and the tag transmission from the tag. A computer as part of a location processor 721 can relay this information to provide a reference location for current and alternate tracking solutions.

Figure 18:
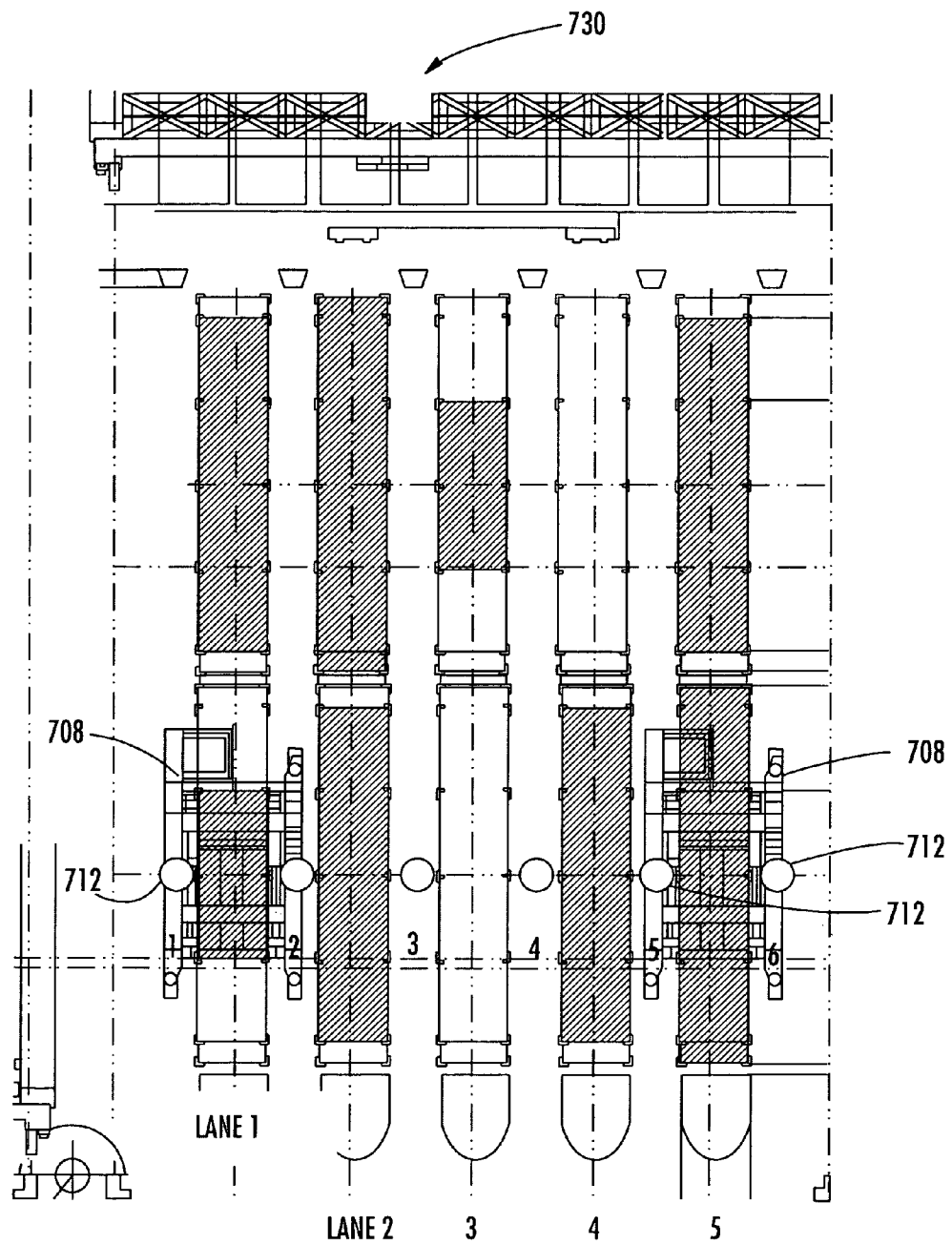
FIG. 18 is a fragmentary plan view of a rail-mounted gantry crane and showing lane identifications for shuttle trucks in which tags are placed in the pavement at lane locations for identifying shuttle trucks in accordance with a non-limiting example of the present invention.

A fragmentary plan view of a rail-mounted gantry (RMG) crane 730 is shown in FIG. 18 with five lanes as illustrated. The RMG crane 730 is similar to the quay crane of FIG. 12 and rail-mounted for shuttle truck 708 movement and handling. Tags 712 placed in the pavement at an RMG lane, as illustrated by the round dots, corresponding to tag locations. Six tags are embedded such that each lane has a tag positioned on either side of the respective lane as illustrated. The tag transmissions from tags 712 in the pavement and the RFID provide verification of a shuttle truck lane, for example, at the waterside end of this rail-mounted gantry crane. Two or more tag interrogators are mounted on the shuttle truck to activate the tag in the pavement irrespective of the shuttle truck orientation. The tag ID and shuttle truck ID as relayed by means of the tag interrogator can be transmitted to a local area network via location access point such as located on a light pole or other elevated surface. Two tags can be activated per shuttle truck entry into the crane. A unique lane could be identified by looking at the combination of tag ID's. For example, if transmissions from tags 1 and 2 are received, the shuttle truck is considered to be in lane 1. The tag transmitter battery life could be five or more years for this type of application.

Figure 19:
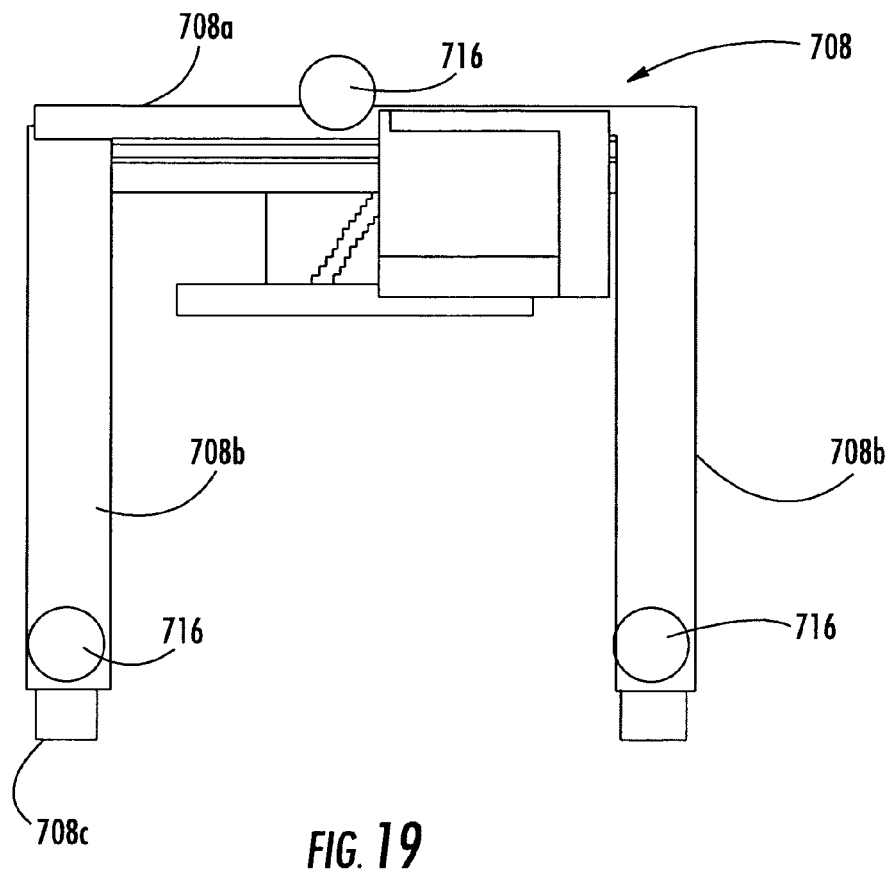
FIG. 19 is a fragmentary, front elevation view of a shuttle truck showing tag interrogators positioned on the shuttle truck in accordance with a non-limiting example of the present invention.

FIG. 19 shows possible general locations of tag interrogators 716 located on a shuttle truck 708. The circles indicate three tag interrogators 716 on a shuttle truck 708, at least one tag interrogator located on the top support 708a near the middle portion of the shuttle truck, and at least one tag interrogator on each leg 708b near the wheel 708c. Power from the shuttle truck can operate the tag interrogators 716. No data interface is required. Two tags could be mounted per tag interrogator nearby to monitor the health status of each tag interrogator and maintain high availability of the system.

Figure 20:
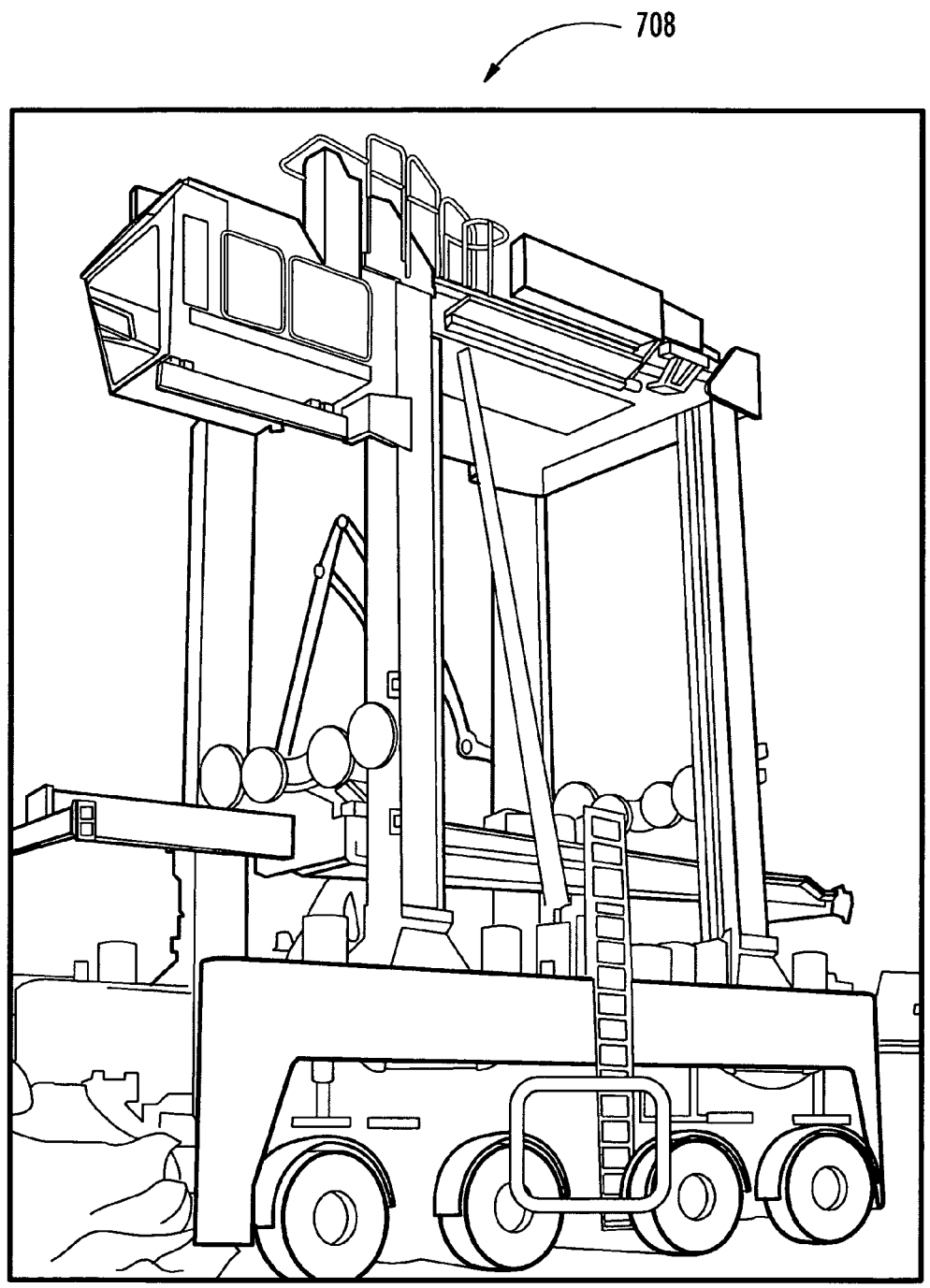
FIG. 20 is an environmental view in perspective showing the general location where tag interrogators can be placed on shuttle truck legs in accordance with a non-limiting example of the present invention.

FIG. 20 shows a representation of a shuttle truck 708 and the general location of tag interrogators on the shuttle truck legs as represented by the rectangular area at the bottom of the shuttle truck near the wheels. One tag interrogator could be located at each leg of the shuttle truck as described before. A tag interrogator could be mounted near the bottom of the shuttle truck on either leg and/or at the middle of the shuttle truck from the front-to-back. The tag interrogator also can activate container ID tags when a tag when a tag is mounted on a container handled by a shuttle truck, helping in identification of a container.

Figure 21:
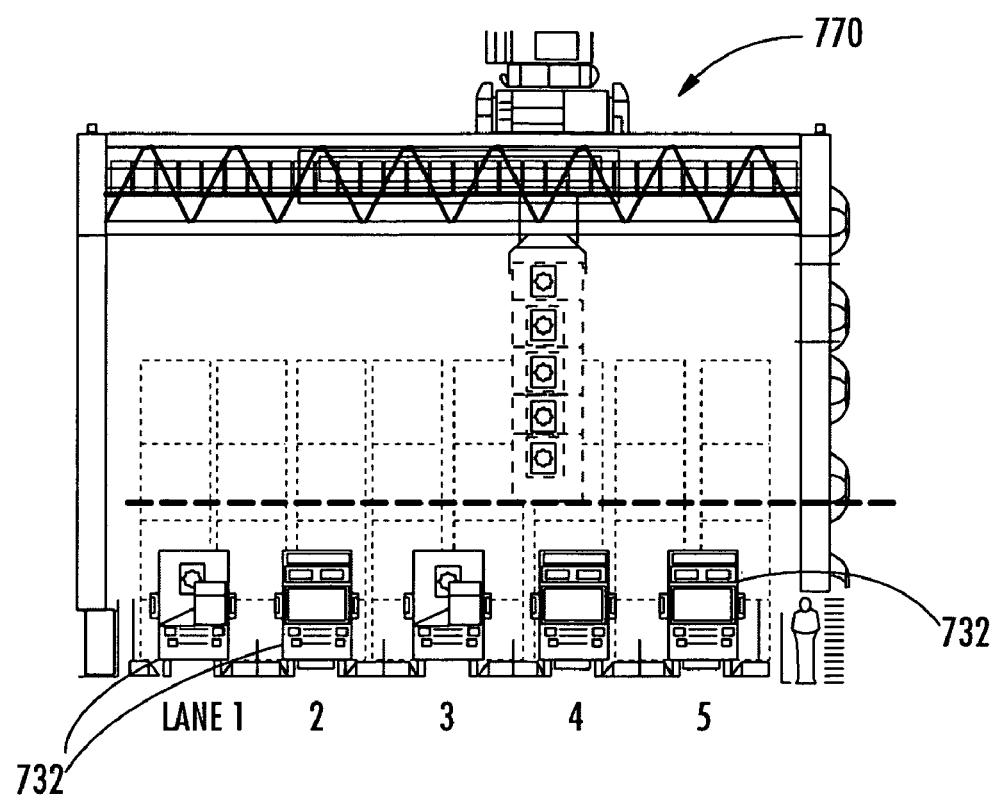
FIG. 21 is an environmental, front elevation view of a utility tractor rig (UTR) on the land side rail-mounted gantry (RMG) crane and showing lane positions for embedded tag transmitters in accordance with a non-limiting example of the present invention.

FIG. 21 shows five lanes for utility tractor rigs at a landside rail-mounted gantry crane 730. In this non-limiting example, one tag interrogator per utility tractor rig 732 is used. Two health status tags could be mounted and positioned per tag interrogator. One tag could be mounted per crane lane using a kiosk mounted system or camera beam mounted system.

Figure 22:
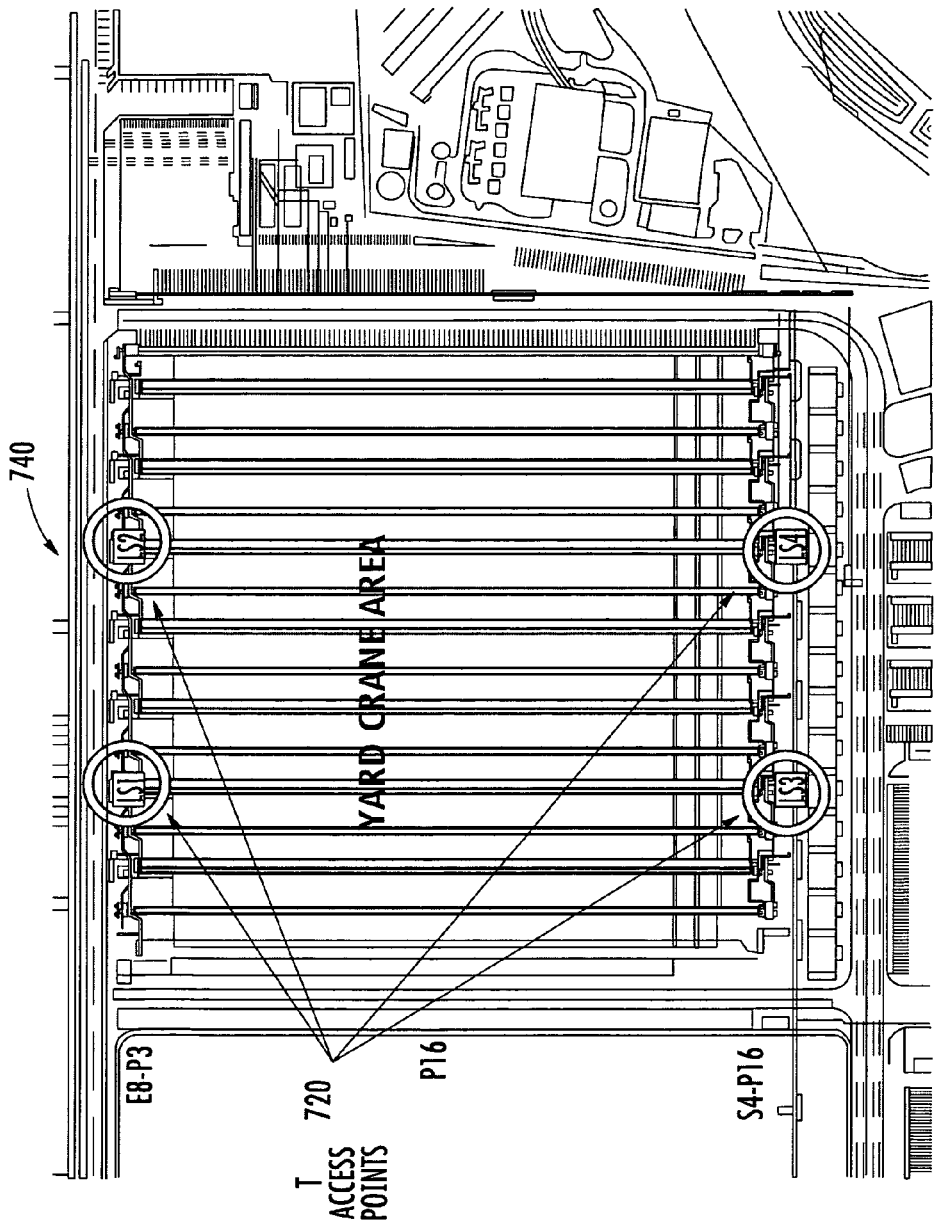
FIG. 22 is a plan view of a yard crane area showing the position of location sensors as locating access points that receive radio frequency transmissions from tags that have been actuated by tag interrogators in accordance with a non-limiting example of the present invention.

FIG. 22 shows a yard crane area 740 having four location sensors as location access points 720 to receive the activated tag transmissions. The access points are ideally positioned to receive RF tag transmissions from any point in the yard and provide full coverage. Typically, any devices operative as access points are positioned on elevated surfaces, for example, utility poles.

Figure 23:
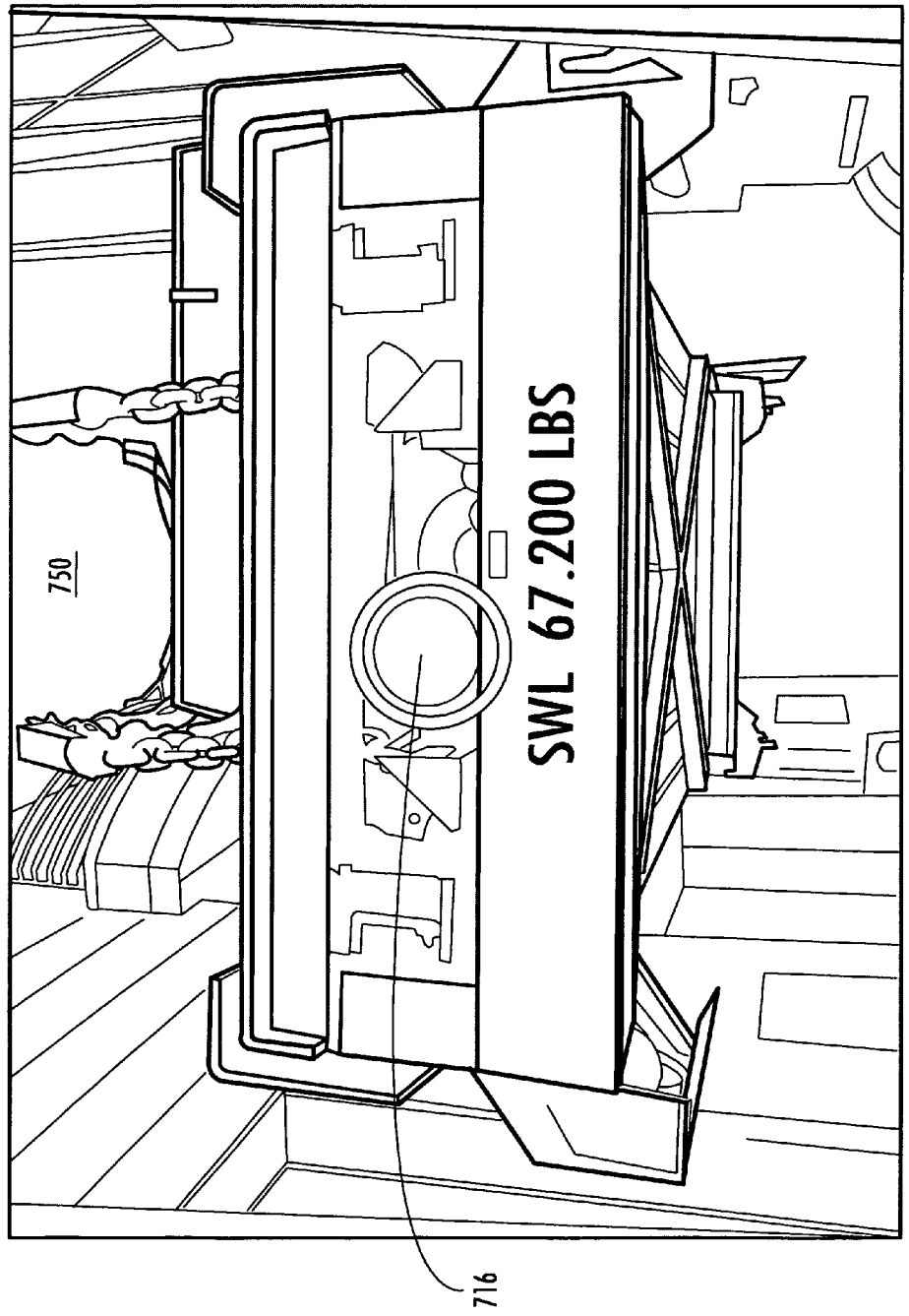
FIG. 23 is an enlarged environmental view of a top handler vehicle showing the location of a tag interrogator in accordance with a non-limiting example of the present invention.

FIG. 23 shows the location of tag interrogator 716 on a top handler 750 also termed container handler. Typically, hundreds of such handlers are deployed at many large marine terminals. In this view, the powered vehicle is at the right (not shown) The actual "handler" that secures containers is shown. Each side could include a tag interrogator, with only one illustrated in the figure.

Figure 24:
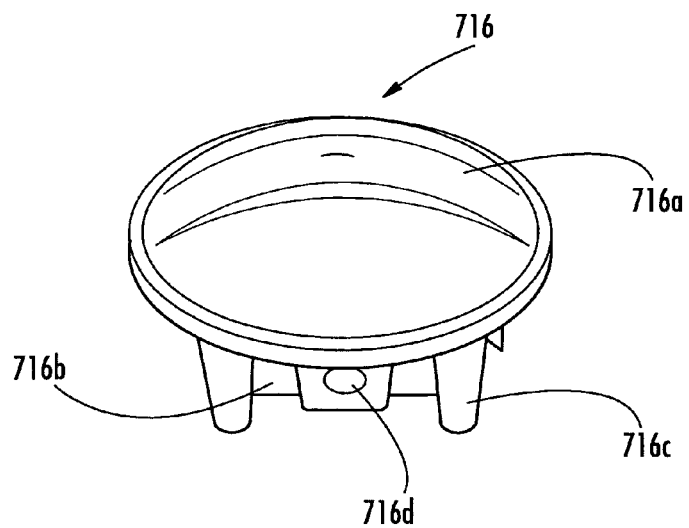
FIG. 24 is a general perspective view of a tag interrogator that can be used in accordance with a non-limiting example of the present invention.
Figure 25:
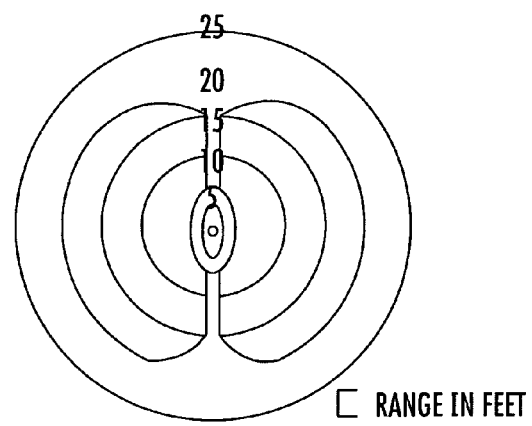
FIG. 25 is a drawing showing an example of the range in feet of tag interrogators in accordance with a non-limiting example of the present invention.

FIG. 24 is an environmental, perspective view of a tag interrogator 716 that activates the tags. For example, as noted before, three tag interrogators could be mounted on a shuttle truck with an adjustable range of about 1 to about 20 feet as shown in the graph of FIG. 25. The specifications of a tag interrogator 716 in a non-limiting example are about 36 volts DC input power with an operating temperature range from about −22 degrees Fahrenheit to about 140 degrees Fahrenheit. The weight of an exemplary tag interrogator is about 2.2 pounds and has a diameter of about 9 inches and depth of about 5 inches as illustrated in this non-limiting example. It is a compact device and could be mounted on a mounting plate for attachment to selected surfaces.

The tag interrogator is a proximity communication device that triggers a tag to transmit a "blink" pattern of a radio frequency signal, typically a spread spectrum signal. When the tag transmitter passes through the tag interrogator's field, the tag can initiate a preprogrammed "blink" rate. In a non-limiting example, the tag interrogator can use a magnetic field-based communication by generating a rotating AC magnetic field as generated by a diverse spatial orientation and two-dimensional arrangement of magnetic field coils, such as described in the incorporated by reference U.S. Pat. No. 6,812,839 and commonly assigned to Wherenet Corporation. The AC magnetic field can rotate over a region of increased sensitivity into which the tag enters and can be representative of information and intended for the object or tag entering the region. This information could include an identification for the device, such as the shuttle truck described before.

As shown in FIG. 24, the tag interrogator 716 is disk-shaped and includes an upper disk-shaped portion 716a and a lower base 716b having a number of support legs 716c that support the tag interrogator when it is secured onto an object. A data interface/power terminal 716d is located at the base 716b as illustrated. The tag interrogator 716 can be programmed as necessary for identifiers and other functions.

In a non-limiting example, 80 tag interrogators and 160 health tags can be used with 20 utility tractor rigs and one tag interrogator per utility tractor rig. Twenty shuttle trucks could each include three tag interrogators per shuttle truck. Two health tags could be used per tag interrogator. Two hundred thirteen (213) tags have been used with 75 tags at the rail-mounted gantry landside and 90 tags at the rail-mounted gantry waterside. Forty-eight (48) tags on cranes could be used. Four location sensors could be used with VSS software such as described before.

In accordance with another non-limiting example of the present invention, permanent tags could be located within or on pavement areas as described above. For example, single-point tags provide a "milepost" or location crossing indication. A line-of-tags could provide a boundary crossing indication. A grid-of-tags could provide X/Y location information.

Figure 26:
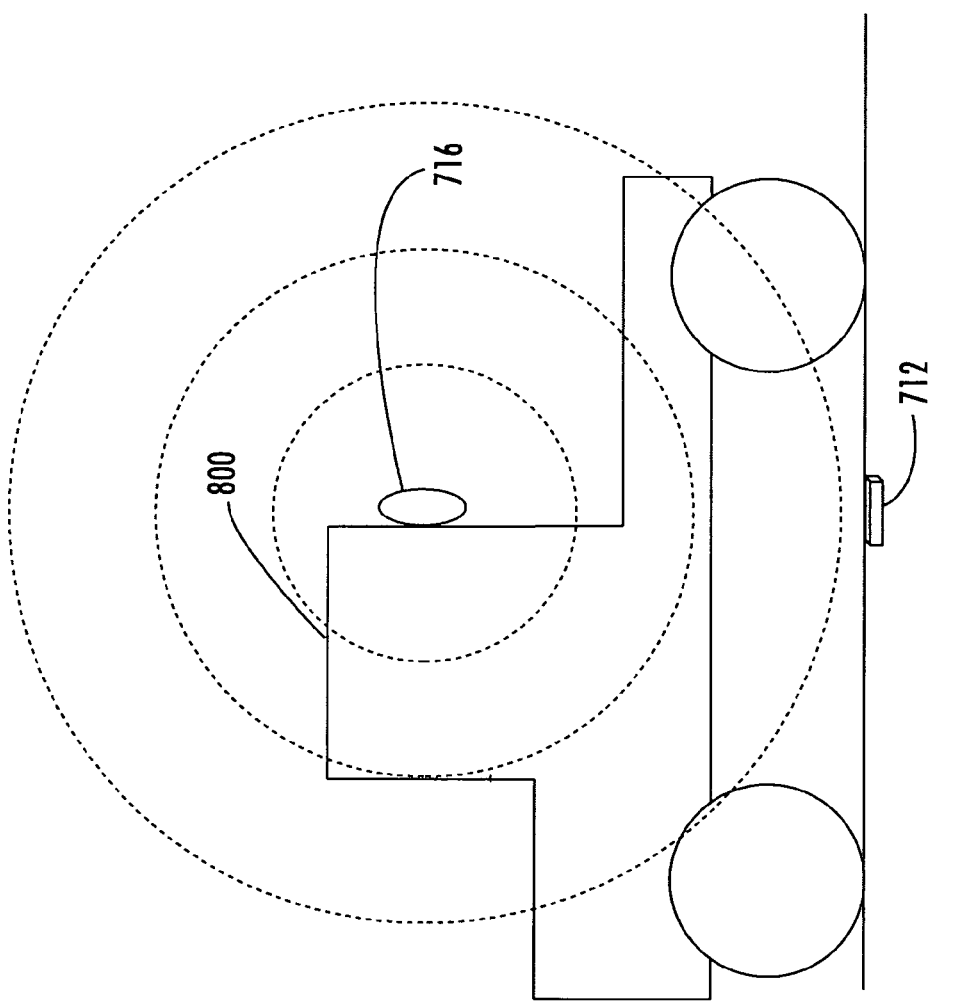
FIG. 26 is a fragmentary, side elevation view showing a tag interrogator operative as a magnetic signal source positioned on a vehicle and operative with a "buried" or embedded tag in accordance with a non-limiting example of the present invention.

As shown in FIG. 26, the tag interrogators 716 are mounted on mobile devices as explained before and shown generally at 800 to excite a tag 712 when in proximity to cause a tag to blink. The permanent milepost tags transmit to a radio frequency (RF) infrastructure that includes access points the ID's of both the tag and tag interrogator as a magnetic signal source. The RF infrastructure of the RF ID and location system processes the received signals for various information requirements, including time of tag (milepost) crossing at which the tag interrogator passed by the embedded or fixed tag. Multiple crossing data points using multiple and spaced tags can be used for mobile device route calculations and integrated data filtering in this non-limiting example.

FIG. 26 shows the vehicle 800 and tag interrogator 716. The magnetic field lines are shown in the dashed circles and are virtually unaffected by the vehicle body as compared to the RF signals that could be affected by the vehicle body. The tag interrogator can also be used as co-location device associated with a towed or carrying device, for example, a container or trailer. In this non-limiting example, the tag 712 is "buried" in the pavement as illustrated. This "buried" tag 712 transmits not only the tag ID, but also the tag interrogator ID to the RF infrastructure formed by the access points and processor for further processing. The system can transmit in configurable, multiple modes such as (1) immediately upon sensing the tag interrogator when it passes over the tag; (2) immediately upon exit of the tag interrogator from the tag area; and (3) delayed either, or both, of above initial detections in 1 and 2.

Figure 27:
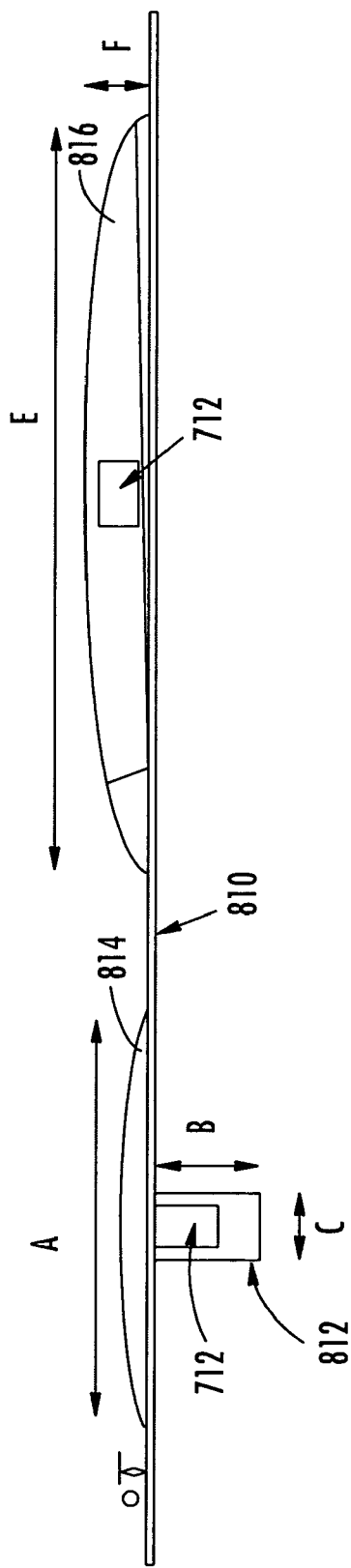
FIG. 27 is a fragmentary side elevation view showing an embedded tag in different implementations used for high and low speed vehicle crossings in accordance with a non-limiting example of the present invention.

As shown in FIG. 27, a high speed and low speed implementation for the tag as a road marker with vehicle operation over pavement 810 when traveling greater or less than 10 mph. A configuration for greater than 10 mph is shown on the left for high speed vehicle operation and a configuration for low speed vehicle operation is shown on the right, i.e., less than 10 mph. Each design is similar to molded plastic highway markers as cover disks or plates that are attached to the pavement surface with a special epoxy. These circular disks or plates are shaped to minimize "tire feel" to the passing vehicles.

As shown at the drawing on the left, the high speed implementation includes the tag 712 that is embedded within a cylindrical housing 812 such as a molded urethane cylinder that is embedded within the pavement surface 810. A 2-inch diameter by 3.5 inch hope can be bored in the pavement represented by dimensions B and C and the hole receives the molded urethane cylinder 812 in this non-limiting example. The circular plate could be about 4-inches diameter and 0.4 inches high represented by dimensions A and D. The molded urethane cylinder 812 could be attached to the underside of the circular plate 814 with epoxy applied on the underside to adhere to the pavement.

The right side drawing shows a low speed implementation with a larger circular plate 816 that is about 12 inches in diameter as shown in dimension E and about 1.25 inches in height as shown by dimension F. The tag 712 is embedded within the circular plate, which can be adhered to the surface 810 as noted before using a special epoxy or similar adhesive. Different materials can be used for the construction of the circular plate including the use of various metals and plastics that are adapted to withstand the heavy vehicle weight on the pavement 810.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for tracking vehicles within a terminal, comprising
at least one tag interrogator mounted on a vehicle to be identified and tracked within the terminal and configured to emit a signal containing data identifying the vehicle to which the tag interrogator is mounted;
at least one tag transmitter fixed at a known location within the terminal where vehicles are to be identified, the tag transmitter being configured to be receptive to a tag interrogator on a vehicle when the vehicle passes within a proximity to the fixed tag transmitter, and configured to transmit a wireless RF signal having data identifying the tag transmitter and identifying the tag interrogator as an identifier for the vehicle to which the tag interrogator is mounted; and
at least one access point positioned at the terminal for receiving the RF signal from the tag transmitter for subsequent processing to verify vehicle identity at the known location.

2. The system according to claim 1, wherein said terminal comprises a cargo container terminal.

3. The system according to claim 2, wherein said vehicle comprises container handling equipment that handles cargo containers that are moved throughout the cargo container terminal.

4. The system according to claim 1, and further comprising a container crane positioned at the known location through which the vehicle to be identified passes.

5. The system according to claim 4, wherein said container crane further comprises a plurality of vehicle lanes, each having at least one tag transmitter associated therewith, each of the at least one tag transmitter associated therewith being configured to respond to any tag interrogators on vehicles passing through a respective lane and verify an identity of the specific vehicle at a specific lane of the container crane.

6. The system according to claim 1, and further comprising a processor operative with the at least one access point and configured to collect data from the access point regarding the tag interrogator and tag transmitter and provide a reference location for current and alternate tracking solutions for the vehicle throughout the terminal.

7. The system according to claim 1, wherein said tag interrogator configured to transmit a magnetic signal carrying identification data that activates the fixed tag transmitter in proximity at the known location for initiating transmission of the RF signal from the tag transmitter.

8. The system according to claim 1, wherein said tag transmitter comprises a road marker fixed to a ground surface to which the tag transmitter is associated.

9. The system according to claim 8, wherein said road marker comprises a substantially circular configured disk secured to the ground surface, wherein said tag transmitter is mounted within said disk or secured to the underside of the disk.

10. The system according to claim 9, and further comprising a protective housing secured to the underside of the disk and carrying the tag transmitter.

11. The system according to claim 1, and further comprising a plurality of tag transmitters distributed throughout the terminal and forming a grid pattern of tag transmitters.

12. A system for tracking an asset within a monitored environment, comprising:
at least one tag interrogator mounted on an asset to be identified and tracked within the monitored environment and configured to emit a signal containing data identifying the asset to which the tag interrogator is mounted;
at least one tag transmitter fixed at a known location within the monitored environment where assets are to be identified, the tag transmitter being configured to be receptive to a tag interrogator on the asset when the asset passes within a proximity to the fixed tag transmitter, and configured to transmit a wireless RF signal having data identifying the tag transmitter and identifying the tag interrogator as an identifier for the asset to which the tag interrogator is mounted; and at least one access point positioned at the terminal for receiving the RF signal from the tag transmitter for subsequent processing to verify the identity of the asset at the known location.

13. The system according to claim 12, wherein said monitored environment comprises a cargo container terminal.

14. The system according to claim 13, wherein said asset comprises container handling equipment that handles cargo containers that are moved throughout the cargo container terminal.

15. The system according to claim 13, and further comprising a container crane positioned at the known location through which the asset to be identified passes.

16. The system according to claim 12, and further comprising a processor operative with the at least one access point and configured to collect data from the access point regarding the tag interrogator and tag transmitter and provide a reference location for current and alternate tracking solutions for the asset throughout the monitored environment.

17. The system according to claim 12, wherein said tag interrogator configured to transmit a magnetic signal carrying identification data that activates the fixed tag transmitter in proximity at the known location for initiating transmission of the RF signal from the tag transmitter.

18. The system according to claim 12, wherein said tag transmitter comprises a road marker fixed to the ground surface to which the tag transmitter is associated.

19. The system according to claim 12, and further comprising a plurality of tag transmitters distributed throughout the monitored environment and forming a grid pattern of tag transmitters.

20. A method for tracking vehicles within a terminal, comprising:

emitting a signal from a tag interrogator mounted on a vehicle to be identified and tracked in the terminal and containing data identifying the vehicle to which the tag interrogator is mounted;

transmitting a wireless RF signal from at least one tag transmitter fixed at a known location within the terminal where vehicles are to be identified in response to the vehicle having the tag interrogator passing within proximity to the fixed tag transmitter, wherein the RF signal includes data identifying the tag transmitter and identifying the tag interrogator and vehicle; and receiving the RF signal from the tag transmitter within at least one access point for subsequent processing to verify vehicle identity at the known location.

21. The method according to claim 20, which further comprises collecting data from the access point regarding the tag interrogator and tag transmitter and processing the data to provide a reference location for current and alternate tracking solutions for the vehicle.

22. The method according to claim 20, which further comprises transmitting a magnetic signal carrying identification data that activates the fixed tag transmitter when in proximity at the known location for initiating transmission of the RF signal from the tag transmitter.

23. The method according to claim 20, which further comprises transmitting the RF signal from a tag transmitter associated with a road marker secured to the ground surface at the known location.

24. The method according to claim 20, which further comprises passing the vehicle through a container crane having a plurality of vehicle lanes and each vehicle lane having at least one tag transmitter associated therewith for responding to any tag interrogators on vehicles passing through a respective lane and verifying the identity of the specific vehicle at a specific lane of the container crane.

25. The method according to claim 20, which further comprises forming a grid pattern from tag transmitters disturbed throughout the terminal.

* * * * *

UNITED STATES PATENT AND TRADEMARK OFFICE
CERTIFICATE OF CORRECTION

| | | |
|---|---|---|
| PATENT NO. | : 7,916,026 B2 | Page 1 of 1 |
| APPLICATION NO. | : 11/938866 | |
| DATED | : March 29, 2011 | |
| INVENTOR(S) | : Johnson et al. | |

It is certified that error appears in the above-identified patent and that said Letters Patent is hereby corrected as shown below:

Column 3,
Line 16, "RE signal" should read --RF signal--.

Signed and Sealed this
Thirteenth Day of March, 2012

David J. Kappos
*Director of the United States Patent and Trademark Office*